(12) United States Patent
Bhaban et al.

(10) Patent No.: US 12,529,595 B2
(45) Date of Patent: Jan. 20, 2026

(54) METHODS FOR DETERMINING PHOTODETECTOR GAIN-VOLTAGE USING OPTICAL SIGNALS

(71) Applicant: Becton, Dickinson and Company, Franklin Lakes, NJ (US)

(72) Inventors: Shreyas Bhaban, San Jose, CA (US); Peter Mage, San Jose, CA (US); Keegan Owsley, Campbell, CA (US); Wenyu Bai, San Jose, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 449 days.

(21) Appl. No.: 17/861,710

(22) Filed: Jul. 11, 2022

(65) Prior Publication Data

US 2023/0014629 A1    Jan. 19, 2023

Related U.S. Application Data

(60) Provisional application No. 63/222,708, filed on Jul. 16, 2021.

(51) Int. Cl.
*G01J 1/44* (2006.01)
*G01N 15/1434* (2024.01)
*G01N 15/10* (2006.01)

(52) U.S. Cl.
CPC ............ *G01J 1/44* (2013.01); *G01N 15/1434* (2013.01); *G01J 2001/4406* (2013.01); *G01N 2015/1006* (2013.01)

(58) Field of Classification Search
CPC ............... G01J 1/44; G01J 2001/4406; G01J 2001/444; G01N 15/1434;

(Continued)

(56) References Cited

U.S. PATENT DOCUMENTS 5,296,910 A    3/1994  Cole
9,157,866 B2 *  10/2015  Matsui ................... G01N 21/93

(Continued)

FOREIGN PATENT DOCUMENTS

EP    20060291226    7/2006

OTHER PUBLICATIONS

Gesecke, C. et al. 2017 "Determination of Background, Signal-to-Noise, and Dynamic Range of a Flow Cytometer: A Novel Practical Method for Instrument Characterization and Standardization" Cytometry Part A, 91A: 1104-1114.

*Primary Examiner* — Michelle M Iacoletti
*Assistant Examiner* — Maher Yazback
(74) *Attorney, Agent, or Firm* — Khin K. Chin; Bret E. Field; BOZICEVIC, FIELD & FRANCIS LLP

(57) ABSTRACT

Aspects of the present disclosure include methods for determining photodetector gain for a plurality of photodetectors in a light detection system. Methods according to certain embodiments include applying a reference voltage to each photodetector in the light detection system, generating a reference data signal for each photodetector at the reference voltage, irradiating with a light source the photodetectors at a plurality of different applied voltages, generating output data signals for each photodetector at each of the plurality of different voltages and calculating gain of the photodetectors at each of the plurality of different applied voltages based on the output data signals for each photodetector at each applied voltage and the reference data signal. Systems (e.g., particle analyzers) having a light source and a light detection system that includes a plurality of photodetectors for practicing the subject methods are also described. Non-transitory computer readable storage medium are also provided.

26 Claims, 11 Drawing Sheets

(58) Field of Classification Search
CPC ......... G01N 2015/1006; G01N 15/149; G01N 15/1425; G01N 15/1459
See application file for complete search history.

(56) References Cited

U.S. PATENT DOCUMENTS

| | | |
|---|---|---|
| 2002/0135764 A1 | 9/2002 | Oka et al. |
| 2005/0135513 A1* | 6/2005 | Kang .................. H03G 3/3036 375/345 |
| 2008/0116389 A1 | 5/2008 | Hacker et al. |
| 2014/0184197 A1* | 7/2014 | Dolinsky ................ G01T 1/208 324/96 |
| 2014/0374622 A1 | 12/2014 | Cronin et al. |
| 2016/0056785 A1* | 2/2016 | Wolfe ....................... G01J 1/44 250/340 |
| 2016/0161393 A1 | 6/2016 | Tahara |
| 2016/0245920 A1 | 8/2016 | Boufounos et al. |
| 2020/0182772 A1 | 6/2020 | Umetsu et al. |
| 2020/0233065 A1* | 7/2020 | Livezey ..................... G01J 1/44 |
| 2020/0256782 A1* | 8/2020 | Hairston ............ G01N 15/1459 |
| 2021/0311174 A1* | 10/2021 | Jiang ........................ G01S 7/489 |
| 2024/0280468 A1* | 8/2024 | Tahara ................ G01N 15/149 |

\* cited by examiner

METHODS FOR DETERMINING PHOTODETECTOR GAIN-VOLTAGE USING OPTICAL SIGNALS

CROSS-REFERENCE TO RELATED APPLICATIONS

Pursuant to 35 U.S.C. § 119 (e), this application claims priority to the filing date of U.S. Provisional Patent Application Ser. No. 63/222,708 filed on Jul. 16, 2021; the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. Using data generated from the detected light, distributions of the components can be recorded and where desired material may be sorted. A flow cytometer includes a photo-detection system made up of the optics, photodetectors and electronics that enable efficient detection of optical signals and its conversion to corresponding electric signals. The electronic signals are processed to obtain parameters that a user can utilize to perform desired analysis. A flow cytometer includes different types of photodetectors to detect a fluorescent signal. When an optical signal (emerging from the fluorescent sample being analyzed in the flow cytometer) is incident on the photodetectors, an electrical signal is produced at its output which is proportional to the incident optical signal. The electrical signal is processed to produce a mean fluorescent intensity (MFI) which is used by the user to gauge the sample being analyzed. The gain of a photodetector is determined from the ratio of the output signal to the input signal. The gain of a photodetector can be used to control the operating range of detection by the photodetector, such as to ensure that sample fluorescence shows up in the operating range of the photodetector with a high degree of confidence. For example, the gain can be used to adjust the level of the optically-induced electrical signal to be resolvable from noise while still being on-scale for the electronics downstream to the signal path.

Typically, the gain of a photodetector is positively correlated to voltage such that the gain of the photodetector can be controlled by modulating the voltage applied to the photodetector. However, this correlation is complicated by numerous parameters including the type of the photodetector, wavelength of incident light as well as temperature. For example, avalanche photodiodes, which are known to be highly dependent on temperature, often exhibit a super-exponential gain-voltage relationship which can vary considerably between different flow cytometers even within the same set of photodetectors. Small variations in applied voltage at high voltage values can lead to large variations in gain. This variation is not acceptable in a calibrated and functioning flow cytometer.

SUMMARY

Aspects of the present disclosure include methods for determining photodetector gain for a plurality of photodetectors in a light detection system. The inventors have discovered that mismatches between photodetector gain and applied voltage can lead to significant errors in output data signals from a photodetector. Errors in the output data signals from one or more photodetectors in a particle analyzer can result in lower accuracy in identifying and characterization of particles. The inventors have found that sequentially characterizing the gain-voltage relationship for a large number of detectors in a particle analyzer is laborious and can result in imprecise gain-voltage curves. The inventors have discovered a fast and precise method for characterizing the photodetector gain-voltage relationship for multiple photodetectors by determining precise photodetector gain-voltage curves that are local to the system simultaneously. In some instances, characterization of photodetector gain-voltage for a plurality of photodetectors in a system at the same time (e.g., all of the photodetectors in a flow cytometer) as described herein provide for accurate identification if one or more of the photodetectors in the light detection system are malfunctioning or require calibration. Parallel identification of gain-to-voltage curves of multiple photodetectors can in some instances, provide for consistency between photodetectors and improved sensitivity of the light detection system.

Methods according to certain embodiments include applying a reference voltage to each photodetector in the light detection system, generating a reference data signal for each photodetector at the reference voltage, irradiating with a light source the photodetectors at a plurality of different applied voltages, generating output data signals for each photodetector at each of the plurality of different voltages and calculating gain of the photodetectors at each of the plurality of different applied voltages based on the output data signals for each photodetector at each applied voltage and the reference data signal. Systems (e.g., particle analyzers) having a light source and a light detection system that includes a plurality of photodetectors for practicing the subject methods are also described. Non-transitory computer readable storage medium are also provided.

In practicing the subject methods, a reference voltage is applied to each photodetector and a reference data signal is generated for each photodetector in the light detection system at the reference voltage. In some embodiments, the reference data signal is a background data signal of each photodetector. In certain instances, methods include determining the background signal from each photodetector over a range of operating voltages of the photodetector, such as determining the background data signal of the photodetector over the entire operating voltage range of each photodetector. The photodetectors are set to different voltages and irradiated with a light source. In some embodiments, methods include applying the reference voltage in an amount sufficient to generate a reference data signal that is greater than photodetector noise from each photodetector by a predetermined separation index. In some instances, the separation index is a difference between the mean of data signals from each of the photodetectors normalized by the square root of the summed squared standard errors. In some instances, the separation index is determined for each photodetector. In certain instances, the separation index is based on background data signals from each photodetector and one or more parameters of the light source, such as irradiation intensity or output spectrum of the light source. In certain embodiments, methods include incrementally increasing the applied reference voltage until the generated reference data signal is distinguishable from the photodetector noise for each photodetector.

In some instances, the plurality of photodetectors are simultaneously irradiated with the light source. In some instances, the plurality of photodetectors are sequentially irradiated with the light source. In some embodiments, the photodetectors are irradiated with the light source at increasing applied voltages, such as at 5 or more different applied voltages, such as 10 or more and including 20 or more different applied voltages. In some instances, methods include increasing the voltage of each photodetector in the light detection system by the same amount. In other instances, the voltage of each photodetector is increased by a different amount. In some embodiments, each increase in applied voltage is based on the two nearest voltages applied to the photodetector. In some instances, the increase in applied voltage is calculated by linear extrapolation from the two nearest voltages applied to the photodetector. In certain instances, the increase in applied voltage is calculated based on a polynomial function that locally approximates a voltage curve for the photodetector. In certain embodiments, the method includes determining baseline noise generated by each photodetector at each of the plurality of different applied voltages. In some instances, the baseline noise generated by each photodetector is determined to be greater than a predetermined threshold at an applied voltage. In certain instances, output data signals are discarded from the photodetectors at the applied voltage when the baseline noise is greater than the predetermined threshold. In some embodiments, methods include increasing the voltage of each photodetector in the light detection system until one or more of the photodetectors is saturated. In certain instances, an output data signal of one or more photodetectors is determined to be saturated. In some embodiments, when one or more of the photodetectors is determined to be saturated, the generated output data signals of the saturated photodetectors are discarded. In some embodiments, when one or more of the photodetectors is determined to be saturated, the intensity of the light source may be reduced from a first intensity to a second, lower intensity, such as where the intensity of the light source is reduced by 5% or more, such as 10% or more and including 50% or more. In some instances, the intensity of the light source is reduced by 2-fold or more, such as by 10-fold or more, such as by 20-fold or more. In some instances, methods include reducing the intensity of irradiation by the light source to a lower intensity, irradiating the photodetectors at the lower intensity and generating output data signals for each photodetector at a plurality of different applied voltages. For example, an output data signal for each photodetector may be generated at a plurality of increasing applied voltages. In certain instances, a scaling factor is calculated for the generated output data signals of the photodetectors that are determined to not be saturated. In some embodiments, methods include determining that the calculated gain for a photodetector changes monotonically between two or more of the different applied voltages. In some instances, methods include determining that the calculated gain for a photodetector changes non-monotonically between two or more of the different applied voltages. In certain instances, methods include discarding one or more output data signals from the photodetector when the calculated gain for a photodetector changes non-monotonically between two or more of the different applied voltages. In some embodiments, methods include generating output data signals for each photodetector at increasing voltages until all of the photodetectors in the light detection system are set to maximum voltage. In some instances, methods include generating output data signals for each photodetector at the plurality of different applied voltages until a maximum photodetector gain is determined for each photodetector. In some instances, methods include generating output data signals for each photodetector at the plurality of different applied voltages until baseline noise generated by a photodetector is greater than a predetermined threshold. In some instances, methods include generating output data signals for each photodetector at the plurality of different applied voltages until a minimal intensity of the light source can be applied to generate an output signal that is greater than the baseline noise of the photodetector. In some instances, methods include generating output data signals for each photodetector at the plurality of different applied voltages until the calculated gain for a photodetector changes non-monotonically between two or more of the different applied voltages.

In some embodiments, methods further include calculating a ratio of photodetector gain-to-voltage at the plurality of voltages for each photodetector in the light detection system. In some instances, the photodetector gain at each applied voltage for each detector is calculated by normalizing the output data signals to the reference data signal. In certain instances, the calculated photodetector gain-to-voltage ratio is plotted for each photodetector in the light detection system. In some embodiments, methods include determining variance between photodetectors in the light detection system based on the plotted gain-to-voltage ratio for each photodetector. In some instances, methods include identifying a malfunctioning (or non-functioning) photodetector in the light detection system based on the plotted gain-to-voltage ratio for the photodetectors. In some embodiments, methods include adjusting one or more photodetectors in the light detection system of the particle analyzer to the detector voltage that generates an output data signal with the highest signal-to-noise ratio. In certain embodiments, an applied voltage that is needed to generate a target photodetector gain is determined from the plot of the calculated gain-to-voltage ratio. In some instances, methods include determining the applied voltage needed to generate a target photodetector gain by interpolation of the plot of the calculated gain-to-voltage ratio.

Aspects of the present disclosure also include systems (e.g., particle analyzer) having a light source and a light detection system that includes a plurality of photodetectors. In some embodiments, light detection systems include a plurality of photodetectors, such as 2 or more photodetectors, such as 5 or more photodetectors, such as 10 or more photodetectors, such as 25 or more photodetectors, such as 50 or more photodetectors, such as 100 or more photodetectors and including 1000 or more photodetectors. In some embodiments, light detection systems also include a plurality of amplifiers where each amplifier is in electrical communication with at least one photodetector, such as 2 or more amplifiers, such as 5 or more amplifiers, such as 10 or more amplifiers, such as 25 or more amplifiers, such as 50 or more amplifiers, such as 100 or more amplifiers and including 1000 or more amplifiers. In certain embodiments, light detection systems include a photodetector array. In some instances, light detection systems include a photodetector array having N photodetectors and an amplifier component having M amplifiers where N is an integer from 4 to 10000 and M is an integer from 4 to 10000. In certain instances, the number of photodetectors in the array is the same as the number of amplifiers (i.e., N is equal to M). In other instances, the number of photodetectors in the array is greater than the number of amplifiers (i.e., N is greater than M). In yet other instances, the number of photodetectors in the array is less than the number of amplifiers (i.e., N is less than M).

In some embodiments, systems also include a processor having memory operably coupled to the processor where the memory includes instructions stored thereon, which when executed by the processor, cause the processor to apply a reference voltage to each photodetector in the light detection system, generate a reference data signal for each photodetector at the reference voltage, irradiate with a light source the photodetectors at a plurality of different applied voltages, generate output data signals for each photodetector at each of the plurality of different voltages and calculate gain of the photodetectors at each of the plurality of different applied voltages based on the output data signals for each photodetector at each applied voltage and the reference data signal. In some embodiments, the system is a particle analyzer. In certain instances, the particle analyzer is incorporated into a flow cytometer, such as where the one or more photodetectors described herein are positioned to detect light from particles in a flow stream.

In embodiments, the system includes memory having instructions stored thereon, which when executed by the processor, cause the processor to apply a reference voltage to each photodetector and to generate a reference data signal for each photodetector at the reference voltage. In some embodiments, the memory includes instructions to determine a background signal from each photodetector over a range of operating voltages of the photodetector, such as determining the background data signal of the photodetector over the entire operating voltage range of each photodetector. In some embodiments, the memory includes instructions to set the photodetectors to different voltages and irradiated with a light source. In some embodiments, the memory includes instructions to apply the reference voltage in an amount sufficient to generate a reference data signal that is greater than photodetector noise from each photodetector by a predetermined separation index. In some instances, the separation index is a difference between the mean of data signals from each of the photodetectors normalized by the square root of the summed squared standard errors. In some embodiments, the memory includes instructions to determine the separation index for each photodetector. In certain instances, the separation index is based on background data signals from each photodetector and one or more parameters of the light source, such as irradiation intensity or output spectrum of the light source. In certain embodiments, the memory includes instructions to incrementally increase the applied reference voltage until the generated reference data signal is distinguishable from the photodetector noise for each photodetector.

In some instances, the memory includes instructions to irradiate the plurality of photodetectors simultaneously. In some instances, the memory includes instructions to irradiate the plurality of photodetectors sequentially. In certain instances, the memory includes instructions to increase the applied voltage to each photodetector, such as increasing the applied voltage to 5 or more different voltages, such as 10 or more and including 20 or more different voltages. The increase in voltage may be the same for each of the photodetectors in the light detection system after each irradiation cycle or may be a different voltage increase for one or more of the photodetectors. In some embodiments, the memory includes instructions to determine the increase in the applied voltage based on the two nearest voltages applied to the photodetector. In some instances, the memory includes instructions to calculate the increase in applied voltage by linear extrapolation from the two nearest voltages applied to the photodetector. In certain instances, the memory includes instructions to calculate the increase in applied voltage based on a polynomial function that locally approximates a voltage curve for the photodetector. In certain embodiments, the memory includes instructions for determining baseline noise generated by each photodetector at each of the plurality of different applied voltages. In some instances, the memory includes instructions for determining that the baseline noise generated by each photodetector is greater than a predetermined threshold at an applied voltage. In certain instances, the memory includes instructions for discarding output data signals from the photodetectors at the applied voltage when the baseline noise is greater than the predetermined threshold.

In some embodiments, the system includes memory having instructions stored thereon, which when executed by the processor, cause the processor to increase the voltage of each photodetector in the light detection system until one or more of the photodetectors is saturated. In some instances, the memory includes instructions to determine that an output data signal of one or more of the photodetectors is saturated. In certain instances, the memory includes instructions to discard one or more output data signals from the photodetectors determined to be saturated. In some embodiments, the memory includes instructions to reduce the intensity of the light source, such as in response to determining that one or more of the photodetectors is saturated. In some instances, the memory includes instructions to reduce the intensity of the light source by 5% or more, such as 10% or more and including 50% or more. In some instances, the memory includes instructions to reduce the intensity of the light source by 2-fold or more, such as by 10-fold or more, such as by 20-fold or more. In certain embodiments, the system includes memory having instructions stored thereon, which when executed by the processor, cause the processor to reduce the intensity of the light source to a lower intensity, irradiate the photodetectors at the lower intensity and generate output data signals for each photodetector at a plurality of different applied voltages. In some instances, the memory includes instructions to generate output data signals at the reduced irradiation intensity for each photodetector at increasing applied voltages. In certain instances, the memory includes instructions to calculate a scaling factor for the generated output data signals of the photodetectors that are determined to not be saturated. In some embodiments, the memory includes instructions for determining that the calculated gain for a photodetector changes monotonically between two or more of the different applied voltages. In some instances, the memory includes instructions for determining that the calculated gain for a photodetector changes non-monotonically between two or more of the different applied voltages. In certain instances, the memory includes instructions for discarding one or more output data signals from the photodetector when the calculated gain for a photodetector changes non-monotonically between two or more of the different applied voltages.

In some embodiments, the memory includes instructions to generate output data signals for each of the plurality of photodetectors at increasing voltages until all of the photodetectors in the light detection system are set to maximum voltage. In some instances, the memory includes instructions for generating output data signals for each photodetector at the plurality of different applied voltages until a maximum photodetector gain is determined for each photodetector. In some instances, the memory includes instructions for generating output data signals for each photodetector at the plurality of different applied voltages until baseline noise generated by a photodetector is greater than a predetermined threshold. In some instances, the memory includes instructions for generating output data signals for each photodetector at the plurality of different applied voltages until a minimal intensity of the light source can be applied to generate an output signal that is greater than the baseline noise of the photodetector. In some instances, the memory includes instructions for generating output data signals for each photodetector at the plurality of different applied voltages until the calculated gain for a photodetector changes non-monotonically between two or more of the different applied voltages.

In some embodiments, the system includes memory having instructions stored thereon, which when executed by the processor, cause the processor to calculate a ratio of photodetector gain-to-voltage at the plurality of voltages for each photodetector in the light detection system. In some instances, the memory includes instructions for calculating the photodetector gain at each applied voltage for each photodetector by normalizing the output data signals to the reference data signal. In certain instances, the memory includes instructions for plotting the calculated photodetector gain-to-voltage ratio is plotted for each photodetector in the light detection system. In some instances, the memory includes instructions for determining variance between photodetector in the light detection system based on the plotted gain-to-voltage ratio for each photodetector. In some instances, the memory includes instructions for identifying a malfunctioning (or non-functioning) photodetector in the light detection system based on the plotted gain-to-voltage ratio for the photodetectors. In some embodiments, the memory includes instructions for adjusting one or more photodetectors in the light detection system of the particle analyzer to the detector voltage that generates an output data signal with the highest signal-to-noise ratio. In certain embodiments, the memory includes instructions for determining an applied voltage that is needed to generate a target photodetector gain from the plot of the calculated gain-to-voltage ratio. In some instances, the memory includes instructions for determining the applied voltage needed to generate a target photodetector gain by interpolation of the plot of the calculated gain-to-voltage ratio.

Aspects of the present disclosure also include non-transitory computer readable storage medium for determining photodetector gain for a plurality of photodetectors in a light detection system. In embodiments, the non-transitory computer readable storage medium includes algorithm for applying a reference voltage to each photodetector in the light detection system, algorithm for generating a reference data signal for each photodetector at the reference voltage, algorithm for irradiating with a light source the photodetectors at a plurality of different applied voltages, algorithm for generating output data signals for each photodetector at each of the plurality of different voltages and algorithm for calculating gain of the photodetectors at each of the plurality of different applied voltages based on the output data signals for each photodetector at each applied voltage and the reference data signal.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
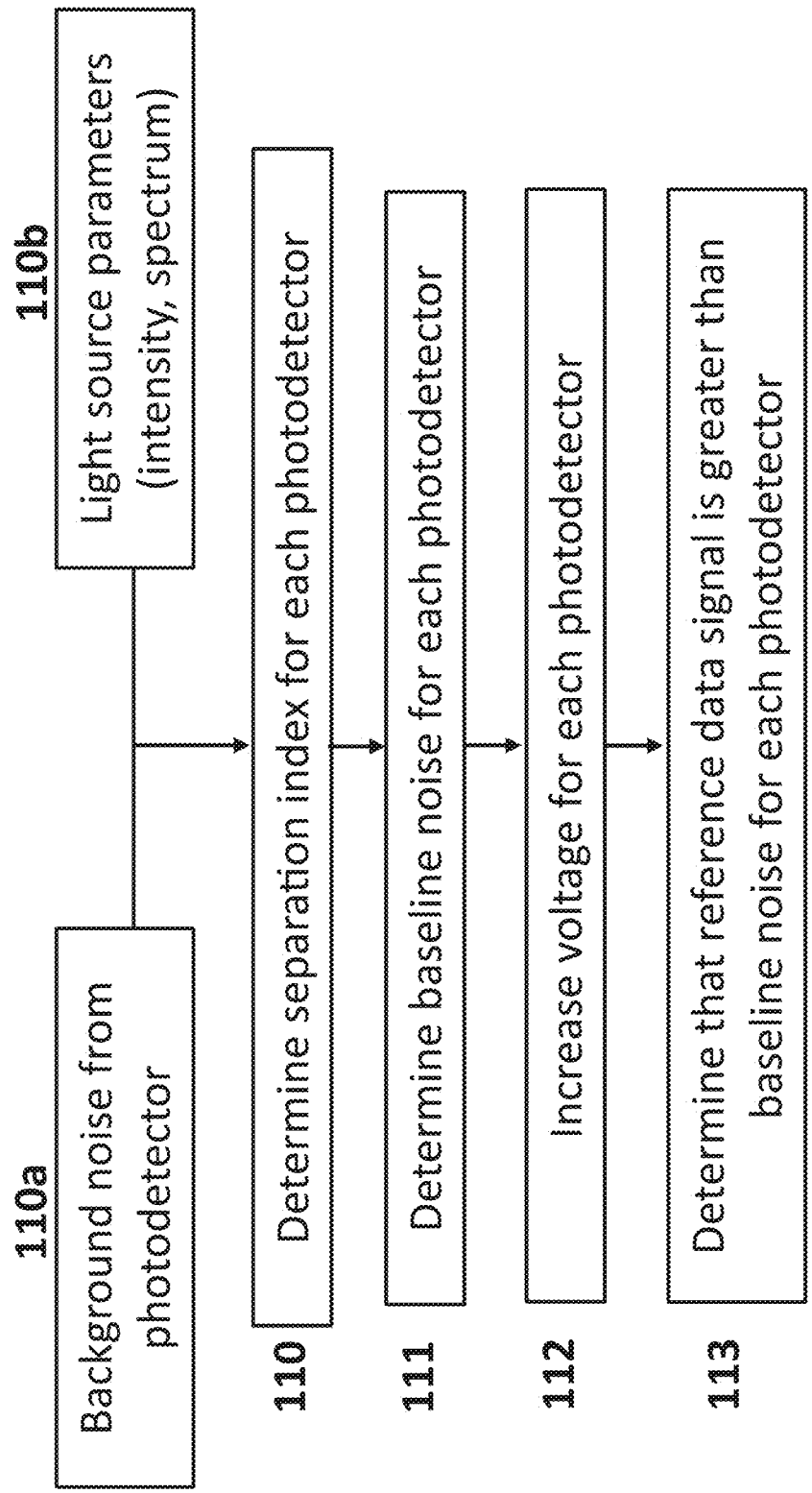
FIG. 1A depicts a flow chart for determining a reference voltage according to certain embodiments.

Aspects of the present disclosure include methods for determining photodetector gain for a plurality of photodetectors in a light detection system. Methods according to certain embodiments include applying a reference voltage to each photodetector in the light detection system, generating a reference data signal for each photodetector at the reference voltage, irradiating with a light source the photodetectors at a plurality of different applied voltages, generating output data signals for each photodetector at each of the plurality of different voltages and calculating gain of the photodetectors at each of the plurality of different applied voltages based on the output data signals for each photodetector at each applied voltage and the reference data signal. Systems (e.g., particle analyzers) having a light source and a light detection system that includes a plurality of photodetectors for practicing the subject methods are also described. Non-transitory computer readable storage medium are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range.

Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining photodetector gain for a plurality of photodetectors in a light detection system. In further describing embodiments of the disclosure, methods for applying a reference voltage to each photodetector in the light detection system, generating a reference data signal for each photodetector at the reference voltage, irradiating with a light source the photodetectors at a plurality of different applied voltages, generating output data signals for each photodetector at each of the plurality of different voltages and calculating gain of the photodetectors at each of the plurality of different applied voltages based on the output data signals for each photodetector at each applied voltage and the reference data signal are first described in greater detail. Next, systems that include a light source and a light detection system having a plurality of photodetectors for practicing the subject methods are described. Non-transitory computer readable storage mediums are also described.

Methods for Determining Photodetector Gain for a Plurality of Photodetectors in a Light Detection System Aspects of the present disclosure include methods for determining photodetector gain for a plurality of photodetectors in a light detection system (e.g., in a particle analyzer of a flow cytometer). In some embodiments, the methods include determining an optimized detector gain for each photodetector in a light detection system. In some embodiments, the subject methods provide for identifying if one or more of the photodetectors in the light detection system are malfunctioning or require calibration. In certain instances, the subject methods provide for simultaneous parameter characterization of a plurality of photodetectors in a light detection system, such as by parallel identification of gain-to-voltage curves of multiple photodetectors. Simultaneous characterization can in some instances, provide for consistency between photodetectors and improved sensitivity of the light detection system.

In certain embodiments, the subject methods provide for an increased signal-to-noise ratio of the light detection system, such as where the signal-to-noise ratio of the light detection system is increased by 5% or more, such as by 10% or more, such as by 25% or more, such as by 50% or more, such as by 75% or more, such as by 90% or more and including by 99% or more. In certain instances, the subject methods increase the signal-to-noise ratio by 2-fold or more, such as by 3-fold or more, such as by 4-fold or more, such as by 5-fold or more and including by 10-fold or more. In some embodiments, the subject methods increase output (e.g., signal amplitude from the photodetectors of the light detection system) by 5% or more, such as by 10% or more, such as by 25% or more, such as by 50% or more, such as by 75% or more, such as by 90% or more and including by 99% or more. In certain instances, the subject methods increase output by 2-fold or more, such as by 3-fold or more, such as by 4-fold or more, such as by 5-fold or more and including by 10-fold or more. In certain embodiments, methods of the present disclosure are sufficient to broaden the range of intensity detection and quantitation by 2 fold or greater, such as by 3 fold or greater, such as by 5 fold or greater, such as by 10 fold or greater, such as by 25 fold or greater, such as by 50 fold or greater and including by 100 fold or greater.

In practicing the subject methods, a reference voltage is applied to each photodetector in the light detection system and a reference data signal for each photodetector at the reference voltage. As described in greater detail below, light detection systems may have 2 or more photodetectors, such as 5 or more, such as 10 or more, such as 15 or more, such as 25 or more, such as 50 or more, such as 100 or more, such as 150 or more, such as 200 or more, such as 250 or more and including 500 or more photodetectors. In some instances, the reference voltage applied is the lowest applied voltage that can be applied to the photodetector that generates a measurable output data signal. In certain instances, the generated reference data signal is a background data signal. The term "background" is used herein in its conventional sense to refer to the baseline electronic signals from each photodetector (e.g., electronic signals that originate from the operating electronic components of the photodetector or optical components of the light detection system). In certain instances, background signals include electronic signals present in the light detection system, such as those generated by a light source or other electronic sub-components of the system. In other embodiments, the background signals include electronic signals that result from vibrational or thermal effects from components of the system. In yet other embodiments, background signals include optical signals, such as light from an irradiation source in the system (e.g., from one or more lasers present in a flow cytometer).

In embodiments, methods include applying the reference voltage to two or more of the photodetectors in the light detection system and generating reference data signals for the photodetectors, such as applying the reference voltage to 3 or more photodetectors, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including applying a reference voltage to 250 or more photodetectors of the light detection system and generating a reference data signal for each photodetector. For example, a reference voltage may be applied to 5% or more of the photodetectors in the light detection system, such as 10% or more, such as 15% or more, such as 20% or more, such as 25% or more, such as 50% or more, such as 75% or more, such as 90% or more, such as 95% or more and including 97% or more of the photodetectors in the light detection system and generating a reference data signal for each photodetector. In certain embodiments, a reference voltage is applied to all of the photodetectors in the light detection system and a reference data signal is generated for each photodetector. In some embodiments, methods include applying the reference voltage in an amount sufficient to generate a reference data signal that is greater than photodetector noise from each photodetector by a predetermined separation index. In some instances, the generated reference data signal is greater than the separation index by at least 1% or more, such as by 2% or more, such as by 3% or more, such as by 4% or more, such as by 5% or more, such as by 10% or more, such as by 15% or more, such as by 20% or more, such as by 25% or more, such as by 50% or more, such as by 75% or more and including by 90% or more. In some instances, the separation index is a difference between the mean of data signals from each of the photodetectors normalized by the square root of the summed squared standard errors. In some instances, methods include determining a distinct separation index for one or more of the plurality of photodetectors, such as 2 or more, such as 3 or more, such as 4 or more, such as 5 or more and including 10 or more. In certain instances, a distinct separation index is determined for 5% or more of the plurality of photodetectors, such as 10% or more, such as 25% or more, such as 50% or more, such as 75% or more and including 90% or more of the plurality of photodetectors. In certain instances, methods include determining a distinct separation index for each of the plurality of photodetectors. In certain instances, a single separation index is determined and applied to each of the plurality of photodetectors. In certain instances, the separation index is based on background data signals from each photodetector and one or more parameters of the light source, such as irradiation intensity or output spectrum of the light source.

In certain embodiments, methods include incrementally increasing the applied reference voltage until the generated reference data signal is distinguishable from the photodetector noise in each photodetector channel. In some instances, the reference voltage is incrementally increased by 0.001% or more until the generated reference data signal is distinguishable from the photodetector noise, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including incrementally increasing the reference voltage by 50% or more until the generated reference data signal is distinguishable from the photodetector noise. For example, the reference voltage may be increased in increments of 0.0001 mV or more until the generated reference data signal is distinguishable from the photodetector noise in that photodetector channel, such as by 0.0005 mV or more, such as by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 2 mV or more, such as by 3 mV or more, such as by 4 mV or more, such as by 5 mV or more, such as by 10 mV or more, such as by 25 mV or more, such as by 50 mV or more, such as by 75 mV or more, such as by 100 mV or more, such as by 250 mV or more, such as by 500 mV or more, such as by 750 mV or more, such as by 1000 mV or more, such as by 2500 mV or more, such as 5000 mV or more and including by 10000 mV or more. In certain embodiments, if the gain control exceeds a predefined threshold and still not enough separation from the noise is found, determining photodetector gain in this photodetector channel may be stopped.

FIG. 1A depicts a flow chart for determining a reference voltage according to certain embodiments for applying to each photodetector according to certain embodiments. The applied reference voltage is sufficient to generate a reference data signal which is detectably greater than photodetector noise. For each photodetector, a separation index is calculated (Step 110) by taking the difference between the mean of data signals from each of the photodetectors normalized by the square root of the summed squared standard errors. The separation index in some instances is based on one or more of background noise from the photodetector (110a) and parameters of the light source (110b), such as LED intensity or output wavelength spectrum. The baseline noise generated by each photodetector is determined at Step 111. The voltage applied to the photodetector is increased in increments at Step 112 until the generated reference data signal is determined to exceed the baseline noise of the photodetector by at least the separation index (Step 113).

In practicing the subject methods, methods include irradiating the photodetectors with a light source at a plurality of applied voltages. In some instances, the plurality of photodetectors is irradiated simultaneously with the light source. In other instances, the plurality of photodetectors is irradiated sequentially with the light source. In embodiments, the photodetectors are irradiated at a predetermined light intensity. In some instances, the intensity of the light source is set to an intensity which is the lowest intensity where the mean fluorescence intensity is greater than the background for the photodetectors. For example, the intensity may be set where the mean fluorescence intensity is greater than the background for the photodetectors by 0.01% or more, such as by 0.05% or more, such as by 0.1% or more, such as by 0.5% or more, such as by 1% or more, such as by 2% or more, such as by 3% or more, such as by 4% or more, such as by 5% or more and including by 10% or more.

The plurality of photodetectors in the light detection systems may be irradiated with any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of infra-red LEDs. In some embodiments, the light source includes one or more LEDs having a low coefficient of variation (cv). In some instances, the LED has a coefficient of variation of 25% or less, such as 20% or less, such as 15% or less, such as 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.4% or less, such as 0.3% or less, such as 0.2% or less, such as 0.1% or less, such as 0.05% or less, such as 0.01% or less, such as 0.001% or less and including where the LED has a coefficient of variation of 0.0001% or less.

In some embodiments, methods include irradiating the photodetectors with a pulsed light source (e.g., pulsed LED light source), such as where light is emitted at predetermined time intervals, each time interval having a predetermined irradiation duration (i.e., pulse width). In certain embodiments, methods include irradiating the photodetectors with the pulsed light source with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In certain embodiments, the light source is a continuous wave light source. The term "continuous wave light source" is used herein in its conventional sense to refer to a source of light which provides uninterrupted light flux and maintains irradiation of the plurality of photodetectors with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In certain embodiments, the light source is a laser, such as continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl)

excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The plurality of photodetectors may be irradiated by the light source from any suitable distance from, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the plurality of photodetectors may be at any suitable angle such as at an angle ranging from 10° to 90°, such as from 15° to 85°, such as from 20° to 80°, such as from 25° to 75° and including from 30° to 60°, for example at a 90° angle.

In some embodiments, methods include irradiating the plurality of photodetectors with the light source at each applied voltage for a predetermined time interval. In some embodiments, the plurality of photodetectors are irradiated at each applied voltage in discrete time intervals of 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. In certain embodiments, each predetermined time interval for irradiating the plurality of photodetectors is the same duration. For instance, each predetermined time interval according to the subject methods may be 50 ms. In other embodiments, the predetermined time intervals for irradiating the plurality of photodetectors at each applied voltage are different.

In embodiments, methods include irradiating the photodetectors with the light source at a plurality of voltages each over a plurality of discrete time intervals, such as 3 or more different voltages, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 75 or more and including 100 or more different voltages. In some embodiments, the voltage applied to each photodetector during an irradiation interval is substantially constant for the duration of each predetermined time interval, such as where the applied voltage to the photodetector varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the applied voltage of the photodetector varies by 0.000001% or less for the duration of the predetermined time interval.

In practicing the subject methods, the voltage applied to each photodetector is changed after each discrete irradiation interval. In some embodiments, 5 or more different voltages are applied to the photodetectors, such as 6 or more, such as 7 or more, such as 8 or more, such as 9 or more, such as 10 or more, such as 15 or more, such as 20 or more, such as 25 or more, such as 30 or more, such as 35 or more, such as 40 or more, such as 50 or more, such as 60 or more, such as 70 or more, such as 80 or more, such as 90 or more, such as 100 or more, such as 150 or more, such as 200 or more, such as 250 or more, such as 500 or more, such as 750 or more and including applying 1000 or more different voltages to the photodetectors. In some embodiments, the applied voltage to each photodetector is increased. In other embodiments, the applied voltage to each photodetector is decreased. The applied voltage to each photodetector may be changed by 5% or more for each subsequent time interval, such as by 10% or more, such as by 25% or more, such as by 50% or more, such as by 75% or more, such as by 90% or more and including by 100% or more. In certain instances, the applied voltage to each photodetector is changed by 1.5-fold or more, such as by 2-fold or more, such as by 3-fold or more, such as by 4-fold or more and including by 5-fold or more. In some embodiments, each increase in applied voltage is based on the two nearest voltages applied to the photodetector. In some instances, the increase in applied voltage is calculated by linear extrapolation from the two nearest voltages applied to the photodetector. In certain instances, the increase in applied voltage is calculated based on a polynomial function that locally approximates a voltage curve for the photodetector. In certain instances, if the calculated bias voltage exceeds a predefined threshold, it will fall back to this threshold so that overshooting can be alleviated.

Figure 1B:
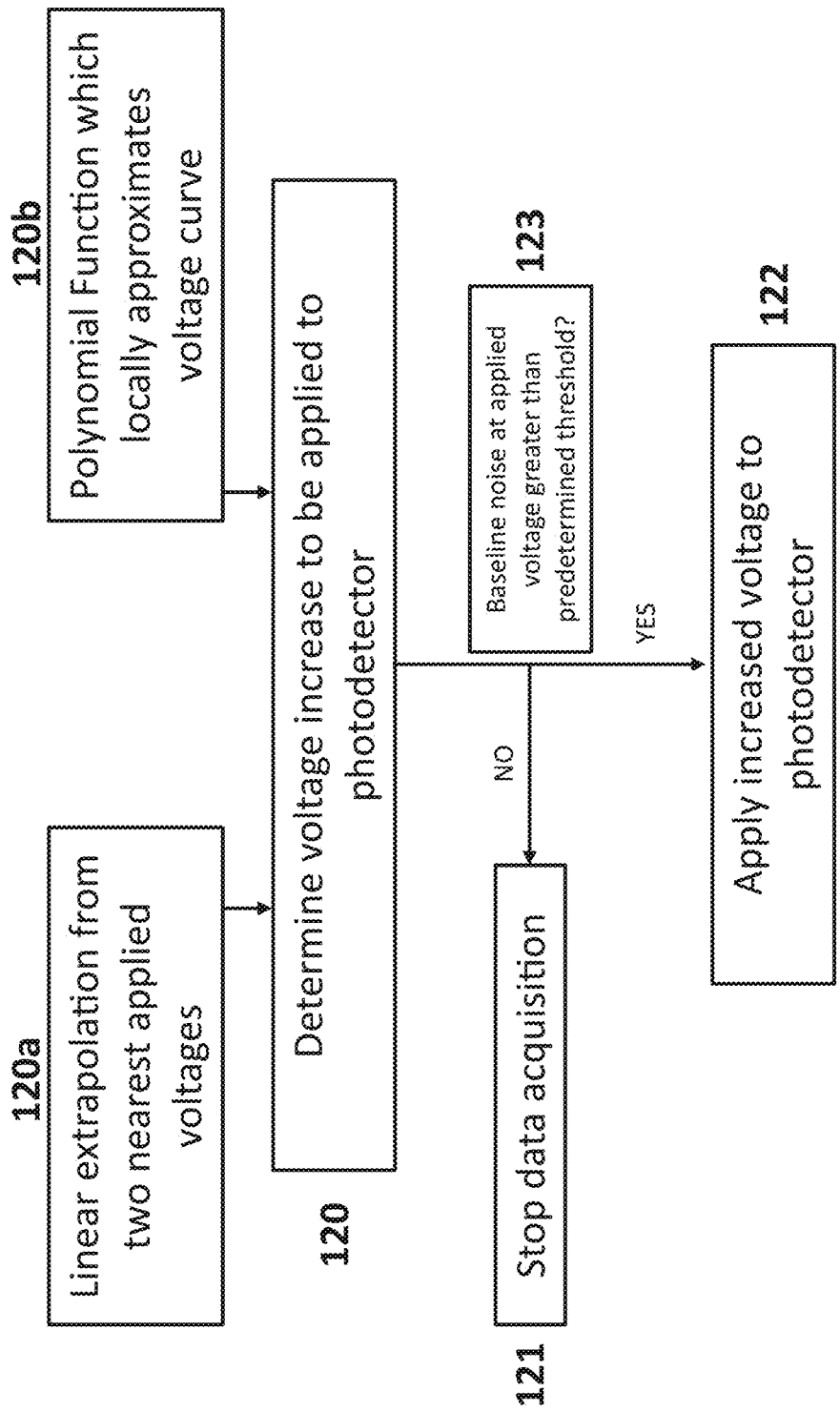
FIG. 1B depicts a flow chart for determining the increase in applied voltage to photodetectors according to certain embodiments.
Figure 1C:
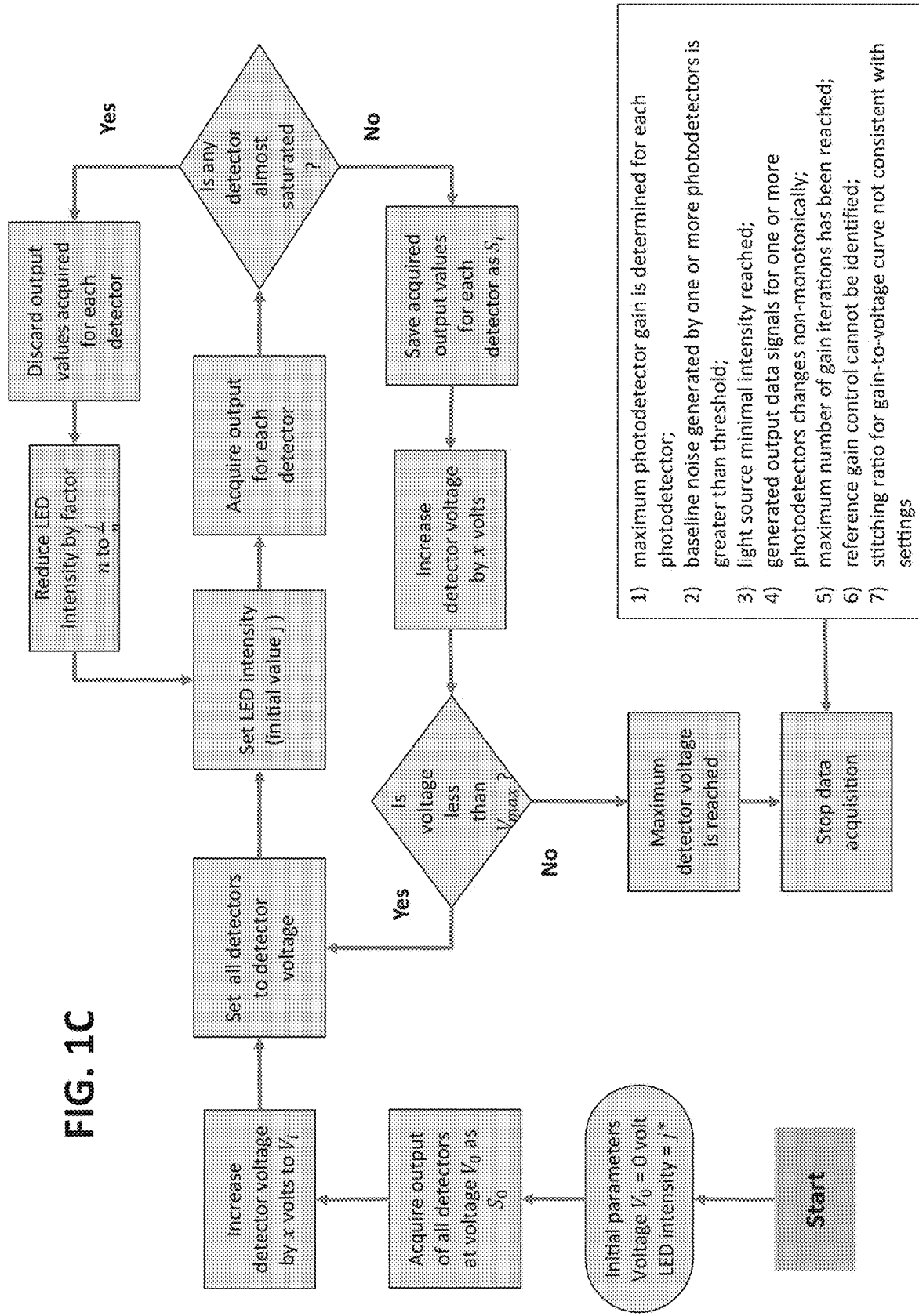
FIG. 1C depicts a flow chart for determining photodetector gain of a plurality of photodetectors according to certain embodiments.

FIG. 1B depicts a flow chart for determining the increase in applied voltage to photodetectors according to certain embodiments. The increase in voltage to be applied to the photodetector according to methods of the present disclosure is determined at Step 120. The increase in applied voltage is in some instances determined by linear extrapolation between the two nearest voltages applied to the photodetector (120*a*), such as the two previous increases in voltages or by a polynomial function which locally approximates the voltage curve for the photodetector (120*b*). In some instances, the data signal generated by the photodetector at the applied voltage is compared to the baseline noise of the photodetector (step 123). Where the baseline noise generated by the photodetector at the applied voltage is greater than a predetermined threshold (e.g., the generated data signal from irradiation by the light source), data acquisition may be stopped (step 121). Where the baseline noise at the applied voltage remains less than the predetermined threshold, the increase to the voltage is applied (step 122) to the photodetector and may be used to calculate the next increase in applied voltage.

In certain embodiments, the method includes determining baseline noise generated by each photodetector at each of the plurality of different applied voltages. In some instances, the baseline noise generated by each photodetector is determined to be greater than a predetermined threshold at an applied voltage, such as by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including by 50% or more. In certain instances, output data signals are discarded from the photodetectors at the applied voltage when the baseline noise is greater than the predetermined threshold, such as when the baseline noise is greater than the predetermined threshold by 1% or more, such as by 2% or more, such as by 3% or more, such as by 4% or more, such as by 5% or more and including when the baseline noise is greater than the predetermined threshold by 10% or more. In certain embodiments, if the baseline noise is measured to be higher than the predetermined threshold, determining photodetector gain in the photodetector channel may be stopped. An empirical bound on the maximum gain is, in certain instances also implemented such that once the gain exceeds this bound determining photodetector gain in the photodetector channel may be stopped.

In some instances, the photodetectors are irradiated with the light source at a plurality of increasing applied voltages. Depending on the type of photodetector (e.g., photomultiplier tube, avalanche photodiode, etc., as described below), the applied voltages may be increased by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including in increasing increments of by 50% or more. In certain instances, the applied voltage is increased by 2-fold or more, such as by 3-fold or more, such as by 5-fold or more and including by 10-fold or more. In some embodiments, the voltage applied to each photodetector in the subject methods is increased by 0.0001 mV or more, such as by 0.0005 mV or more, such as by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 2 mV or more, such as by 3 mV or more, such as by 4 mV or more, such as by 5 mV or more, such as by 10 mV or more, such as by 25 mV or more, such as by 50 mV or more, such as by 75 mV or more, such as by 100 mV or more, such as by 250 mV or more, such as by 500 mV or more, such as by 750 mV or more, such as by 1000 mV or more, such as by 2500 mV or more, such as 5000 mV or more and including by 10000 mV or more.

In some instances, methods include maintaining irradiation of each photodetector in the light detection system by the light source while the applied voltage to each photodetector is being changed (e.g., while the applied voltage to each photodetector is being increased). In other instances, methods include stopping irradiation of one or more of the photodetectors in the light detection system by the light source for the duration the voltage applied to the photodetectors is being changed (e.g., by turning off the light source or by blocking the light source such as with a chopper, beam stop, etc.). Any convenient protocol can be used to provide intermittent irradiation, such as an electronic switch for turning the light source on-and-off, such as a switch that is computer-controlled and triggered based on a data signal (e.g., received or inputted data signal). In some embodiments, the time interval for changing the applied voltage to each photodetector may be 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 6 ms or more, such as 7 ms or more, such as 8 ms or more, such as 9 ms or more and including 10 ms or more. For example, the time period between each predetermined time interval for irradiating the plurality of photodetectors with the light source may be from 0.001 ms to 25 ms, such as from 0.005 ms to 20 ms, such as from 0.01 ms to 15 ms, such as from 0.05 ms to 10 ms and including from 0.1 ms to 5 ms. In certain embodiments, methods include determining one or more noise parameters of each photodetector from the background data signal at each applied voltages, such as 2 or more noise parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including determining 250 or more noise parameters of each photodetector from the background data signal at each applied voltage.

Methods of the present disclosure also include detecting light with each photodetector in the light detection system at each applied voltage. Photodetectors for practicing the subject methods may be any convenient light detecting protocol, including but not limited to photosensors or photodetectors, such as active-pixel sensors (APSs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, avalanche photodiodes (APDs), photomultiplier tubes (PMTs), silicon photomultipliers (SiPMs), phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments, light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths. In some embodiments, methods include measuring light over a range of wavelengths (e.g., 200 nm-1500 nm). For example, methods may include collecting spectra of light over one or more of the wavelength ranges of 200 nm-1500 nm. In yet other embodiments, methods include measuring light at one or more specific wavelengths. For example, the light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In some embodiments, methods include generating one or more output data signals from the photodetector for the plurality of light intensities at each applied voltage, such as 2 or more data signals, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including 250 or more data signals at each detector gain setting. In some embodiments, methods include determining a mean value of the light irradiation data signals from the photodetector at each applied voltage. In certain instances, methods include determining a mean value and standard deviation value for the light irradiation data signals from each photodetector in the light detection system at each applied voltage.

In some embodiments, methods include integrating the output data signals from each irradiated photodetector in the light detection system. In some embodiments, integrating the output data signals from each photodetector includes integrating the output data signals over 10% or more of the duration of each discrete interval of irradiation, such as 15% or more, such as 20% or more, such as 25% or more, such as 50% or more, such as 75% or more, such as 90% or more and including integrating the data signals over 99% of the duration of each discrete interval of irradiation. In some embodiments, the output data signals from each photodetector in the light detection system are integrated over the entire duration of each discrete time interval of irradiation according to the subject methods.

In some embodiments, methods include increasing the voltage of each photodetector in the light detection system until one or more of the photodetectors is saturated. The term "saturated" is used herein in its conventional sense to refer to the upper limit of detection by the photodetector where output data signals exhibit little to no change in response to increasing light irradiation intensity or applied voltage. In certain instances, the photodetector is saturated when the photodetector at its maximal detection limit. In other instances, the photodetector is saturated when the photodetector is set to its maximal applied voltage setting. Methods according to certain embodiments include determining that one or more of the photodetectors of the light detection system is saturated based on the output data signals. For example, depending on the number of photodetectors in the light detection system two or more of the photodetectors may be determined to be saturated, such as 3 or more, such as 4 or more, such as 5 or more, such as 6 or more, such as 7 or more, such as 8 or more, such as 9 or more, such as 10 or more, such as 15 or more, such as 25 or more, such as 50 or more and including determining that 100 or more of the photodetectors in the light detection system are saturated. In certain instances, methods include determining the percentage of photodetectors that are saturated at an applied voltage setting, such as 1% or more, such as 2% or more, such as 3% or more, such as 4% or more, such as 5% or more, such as 10% or more, such as 20% or more, such as 30% or more, such as 40% or more, such as 50% or more, such as 75% or more and including determining that 90% or more of the photodetectors in the light detection system are saturated at an applied voltage setting. In certain embodiments, when one or more of the photodetectors is determined to be saturated, the generated output data signals of the saturated photodetectors are discarded.

In some embodiments, when one or more of the photodetectors is determined to be saturated, the intensity of the light source may be reduced to a lower intensity. In some embodiments, the intensity of the light source may be reduced from a first intensity to a second, lower intensity where the intensity of the light source is reduced by 1% or more, such as by 2% or more, such as by 3% or more, such as by 4% or more, such as by 5% or more, such as by 6% or more, such as by 7% or more, such as by 8% or more, such as by 9% or more, such as 10% or more, such as by 20% or more, such as by 30% or more, such as by 40% or more, such as by 50% or more, such as by 60% or more, such as by 70% or more, such as by 80% or more, such as by 90% or more and including by reducing the intensity of the light source by 95% or more. In certain instances, the intensity of the light source is reduced by 99% or more. In some instances, the intensity of the light source is reduced by 1.5-fold or more, such as 2-fold or more, such as by 3-fold or more, such as by 4-fold or more, such as by 5-fold or more, such as by 6-fold or more, such as by 7-fold or more, such as by 8-fold or more, such as by 9-fold or more, such as by 10-fold or more, such as by 15-fold or more, such as by 20-fold or more, such as by 25-fold or more, such as by 50-fold or more and including reducing intensity of the light source by 100-fold or more.

In some embodiments, methods include reducing the intensity of irradiation by the light source to a lower intensity (as described above), irradiating the photodetectors at the lower intensity and generating output data signals for each photodetector at a plurality of different applied voltages. In some instances, the photodetectors are irradiated at the lower intensity at 2 or more different applied voltages, such as 3 or more different voltages, such as 4 or more, such as 5 or more, such as 6 or more, such as 7 or more, such as 8 or more, such as 9 or more, such as 10 or more, such as 15 or more, such as 20 or more and including 25 or more or more different voltages. In some instances, the photodetectors are irradiated at the lower intensity at a plurality of increasing applied voltages, such as where the applied voltages may be increased by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including in increasing by 50% or more.

In some embodiments, methods including irradiating the photodetectors at the lower intensity until one or more of the photodetectors are saturated. In these embodiments, methods may include repeating this irradiation cycle (i.e., determining that one or more photodetector is saturated, lowering the irradiation intensity of the light source and irradiating the photodetectors at the lowered irradiation intensity at increasing applied voltages until one or more photodetectors are saturated) one or more times, such as 2 or more times, such as 3 or more times, such as 4 or more times, such as 5 or more times, such as 6 or more times, such as 7 or more times, such as 8 or more times, such as 9 or more times and including 10 or more times. In certain instances, a scaling factor is calculated for the generated output data signals of the photodetectors that are determined to not be saturated. In certain instances, a different scaling factor is calculated for each photodetector based on one or more parameters of the light source, such as the intensity variation at different emitted wavelengths or the spectral sensitivity of the photodetector. In some embodiments, methods include determining that the calculated gain for a photodetector changes monotonically between two or more of the different applied voltages, such as 3 or more, such as 4 or more, such as 5 or more and including between 10 or more different applied voltages. In some instances, methods include determining that the calculated gain for a photodetector changes non-monotonically between two or more of the different applied voltages. For example, the calculated gain may be determined to be within the noise level of the photodetector channel, exhibiting non-monotonic changes between different applied voltages. In certain instances, methods include discarding one or more output data signals from the photodetector when the calculated gain for a photodetector changes non-monotonically between two or more of the different applied voltages.

In some embodiments, methods include generating output data signals for each photodetector at increasing voltages until all of the photodetectors in the light detection system are set to maximum voltage. In certain embodiments, methods include repeating each irradiation cycle until a predetermined number of photodetectors in the light detection system reaches a maximum applied voltage or exhibit a saturated output data signal. In some instances, irradiation cycles are repeated until 5% or more of the photodetectors reach a maximum applied voltage or exhibit a saturated output data signal, such as 10% or more, such as 20% or more, such as 30% or more, such as 40% or more, such as 50% or more, such as 60% or more, such as 70% or more, such as 80% or more, such as 90% or more, such as 95% or more, such as 97% or more, such as 99% or more and including where 99.9% or more of the photodetectors in the light detection system have reached a maximum applied voltage or exhibit a saturated output data signal. In certain embodiments, methods including repeating the irradiation cycle until all (i.e., 100%) of the photodetectors in the light detection system have reached a maximum applied voltage or exhibit a saturated output data signal. In some instances, methods include generating output data signals for each photodetector at the plurality of different applied voltages until a maximum photodetector gain is determined for each photodetector. In some instances, methods include generating output data signals for each photodetector at the plurality of different applied voltages until baseline noise generated by a photodetector is greater than a predetermined threshold. In some instances, methods include generating output data signals for each photodetector at the plurality of different applied voltages until a minimal intensity of the light source can be applied to generate an output signal that is greater than the baseline noise of the photodetector. In some instances, methods include generating output data signals for each photodetector at the plurality of different applied voltages until the calculated gain for a photodetector changes non-monotonically between two or more of the different applied voltages. In certain instances, methods include generating output data signals for each photodetector at the plurality of different applied voltages until failure to identify a reference gain control.

FIG. 10 depicts a flow chart for determining photodetector gain of a plurality of photodetectors according to certain embodiments. A reference voltage $V_0$ is applied to each photodetector in the light detection system and a reference data signal $S_0$ is generate for each of the photodetectors. The voltage of each photodetector is increased to a voltage $V_i$ and the light source (e.g., an LED) is set to an intensity j. As described above, the initial intensity j set for the light source is in certain instances, the lowest intensity of the light source (e.g., lowest intensity setting of an LED) such that the mean fluorescence (MFI) is greater than the background for all of the photodetectors in the light detection system. Each of the photodetectors is irradiated simultaneously by the light source set at intensity j and an output data signal $S_i$ is generated for each photodetector set to voltage $V_i$ in the light detection system. In some embodiments, the voltage of each photodetector is increased multiple times (i.e., $V_{i+1}$, $V_{i+2}$, ... $V_n$) and irradiated by the light source set at intensity j generating output data signals at each photodetector voltage setting (i.e., $S_{i+1}$, $S_{i+2}$, ... $S_n$). When one or more photodetectors in the light detection system are determined to be at or near saturation, output data signals from saturated photodetectors may be discarded. In some embodiments, the intensity of the light source is reduced, such as by a factor n to an intensity of j/n. The photodetectors in the light detection system are irradiated at increasing voltages and irradiated by the light source set at reduced light intensity j/n to generate output data signals. In certain instances, a scaling factor is calculated for the output data signals generated by irradiating the photodetectors at reduced light intensity j/n. Irradiation of the photodetectors of the light detection system is repeated until one or more photodetectors reaches a maximum voltage setting. In some instances, data acquisition may also be stopped based on one or more of: 1) a maximum photodetector gain is determined for each photodetector; 2) baseline noise generated by one or more photodetectors is greater than a predetermined threshold; 3) a minimal light intensity from the light source is reached; 4) generated output data signals for one or more photodetectors changes non-monotonically; 5) maximum number of gain iterations has been reached; 6) a reference gain control cannot be identified; and 7) the stitching ratio for gain-to-voltage curve is not consistent with system settings.

Output data signals from the photodetectors are generated for each of the plurality of applied voltages. In some embodiments, the generated output data signals for the plurality of applied voltages are compared to the reference data signal at each applied voltage. In some embodiments, methods further include calculating a ratio of photodetector gain-to-voltage at the plurality of voltages for each photodetector in the light detection system. In some instances, the photodetector gain at each applied voltage for each detector is calculated by normalizing the output data signals to the reference data signal. In certain instances, the gain of each photodetector is calculated at each voltage according to:

1) Gain ($G_0$) at reference voltage, $V_0$=output data signal $S_0$ obtained at reference voltage $V_0$ divided by output data signal $S_0$ obtained at reference voltage $V_0$=1. (i.e., $G_0$=1)
2) Gain ($G_1$) at voltage, $V_1$ (where $V_1 > V_0$)=output data signal $S_1$ obtained at voltage $V_1$ divided by output data signal $S_0$ obtained at applied voltage $V_1$=$S_1/S_0$. (i.e., $G_1 = S_1/S_0$)
3) Gain ($G_2$) at voltage, $V_2$ (where $V_2 > V_1$)=output data signal $S_2$ obtained at voltage $V_2$ divided by output data signal $S_0$ obtained at applied voltage $V_2$=$S_2/S_0$. (i.e., $G_2 = S_2/S_0$)
4) Gain ($G_{n+1}$) at voltage, $V_{n+1}$ (where $V_{n+1} > V_n$)=output data signal $S_{n+1}$ obtained at voltage $V_{n+1}$ divided by output data signal $S_0$ obtained at applied voltage $V_{n+1}$=$S_{n+1}/S_0$. (i.e., $G_{n+1} = S_{n+1}/S_0$)

5) Gain ($G_{max}$) at photodetector maximum voltage, $V_{max}$=output data signal $S_{max}$ obtained at photodetector maximum voltage $V_{max}$ divided by output data signal $S_0$ obtained at photodetector maximum voltage $V_{max}$=$S_{max}/S_0$. (i.e., $G_{max}$=$S_{max}/S_0$)

In certain instances, the calculated photodetector gain-to-voltage ratio is plotted for each photodetector in the light detection system. In some instances, the plotted gain-to-voltage ratio includes the gain of each photodetector at each applied voltage before determining that one or more photodetectors in the light detection system are saturated. In other instances, the plotted gain-to-voltage ratio includes the gain of each photodetector at each applied voltage after one or more of photodetectors in the light detection system are saturated, such as by post-process stitching of the gain-to-voltage ratios using the calculated scaling factor described above. In certain embodiments, plotting the gain-to-voltage ratio for each photodetector in the light detection system may be fully automated, such that calibration and determining the gain of each photodetector require little to no human intervention or manual input by the user.

Figure 2:
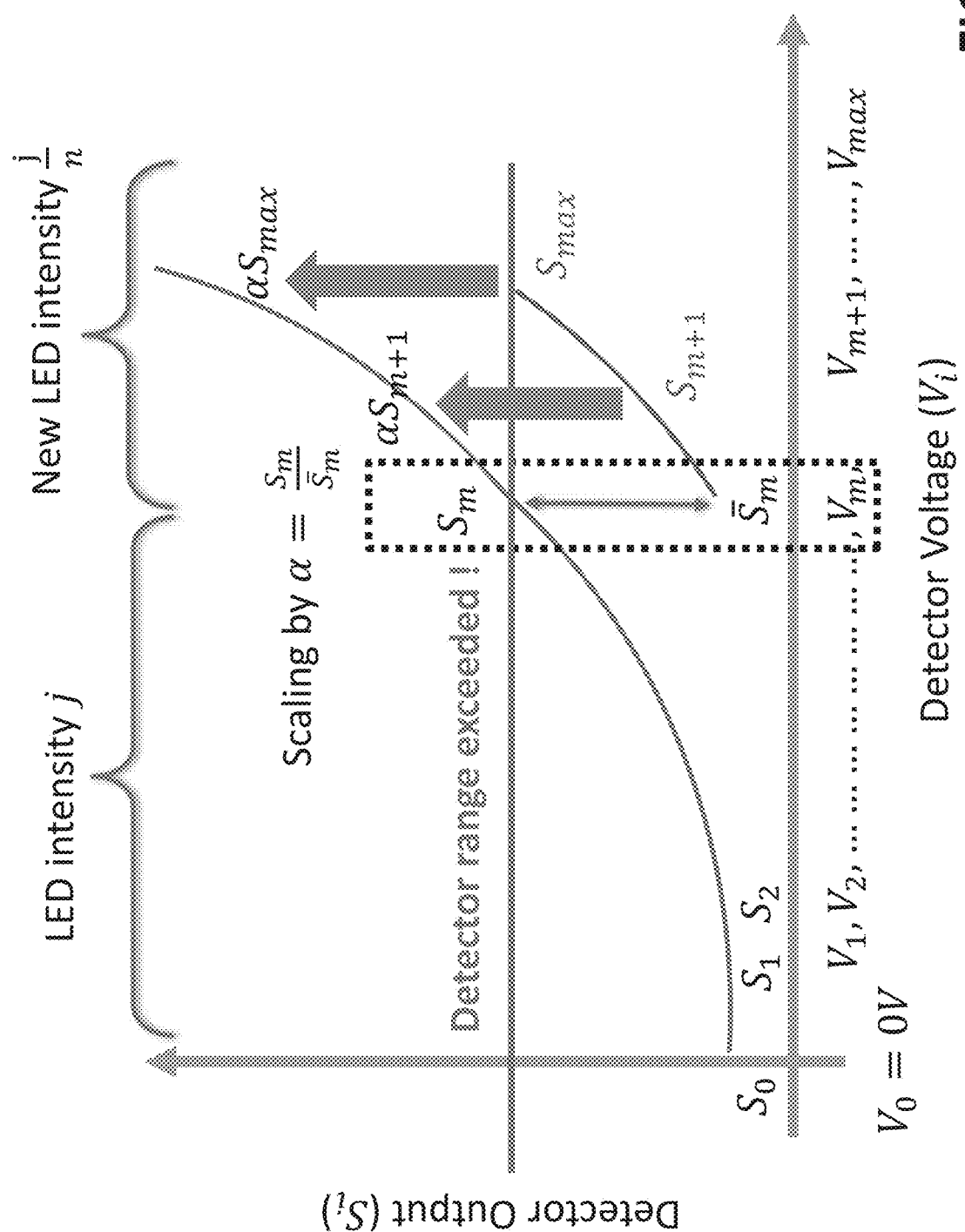
FIG. 2 depicts plotting output data signals vs. voltage for a photodetector according to certain embodiments.

FIG. 2 depicts plotting output data signals vs. voltage for a photodetector according to certain embodiments. The reference data signal $S_o$ is plotted at the reference voltage $V_0$ which is set at 0 volts. As the voltage applied to the photodetector is increased (i.e., $V_{i+1}$, $V_{i+2}$, . . . $V_n$), the photodetector is irradiated to generate output data signals (i.e., $S_{i+1}$, $S_{i+2}$ . . . $S_n$) increases until the photodetector is saturated (detector range is exceeded) for the intensity, j, of the light source used to irradiate the photodetectors. In some instances, the intensity of the light source is decreased to a reduced intensity j/n and the photodetector is irradiated with the light source set at reduced intensity j/n to generate output data signals. The voltage of the photodetector is increased until the photodetector again is saturated or where a maximum applied voltage is reached. A scaling factor (a) is calculated for the output data signals generated by irradiating the photodetector at reduce intensity j/n and used to complete the output data signal vs voltage curve above the saturation level of the photodetector.

Figure 3:
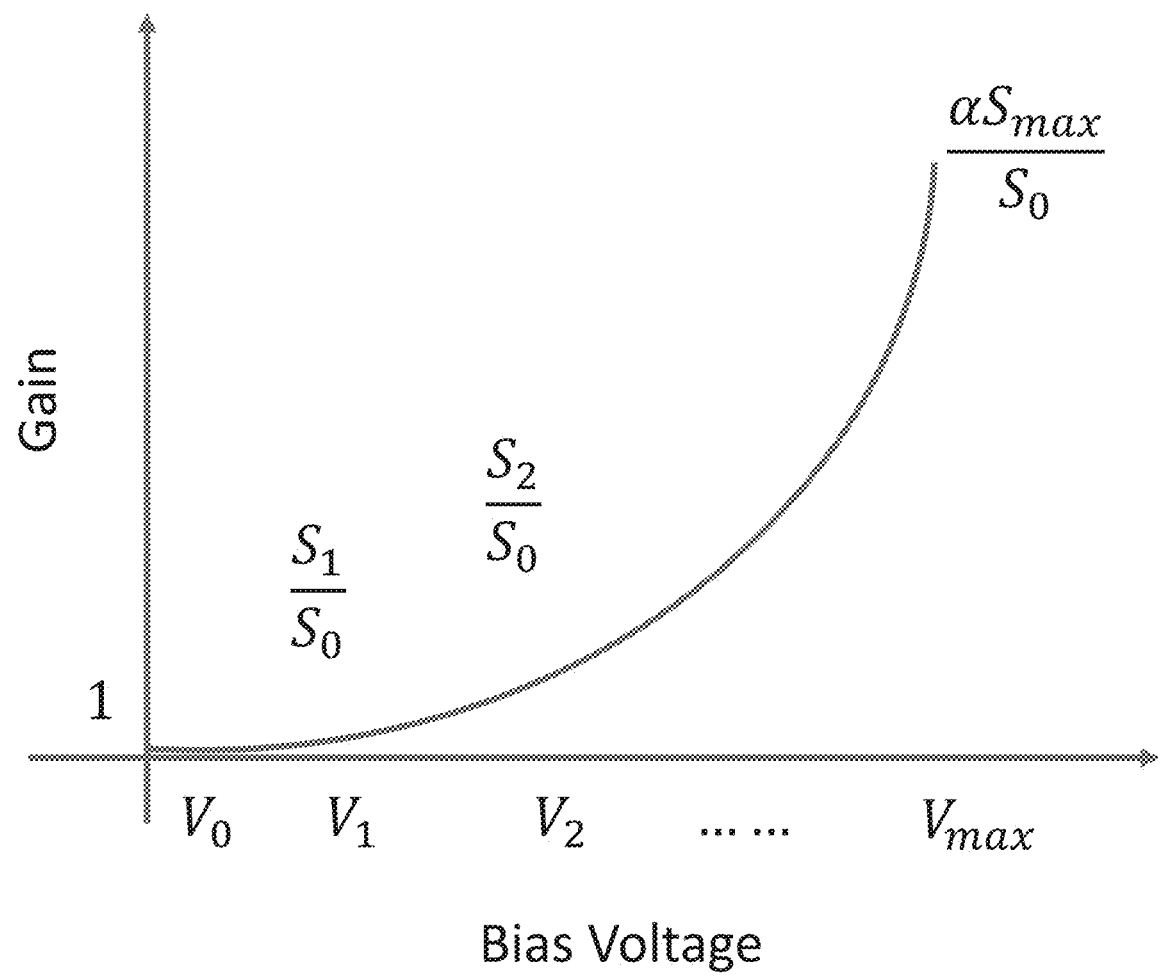
FIG. 3 depicts plotting gain-to-voltage of a photodetector according to certain embodiments.

FIG. 3 depicts plotting gain-to-voltage of a photodetector according to certain embodiments. As described above, a reference voltage $V_0$ is applied to the photodetector and a reference data signal $S_o$ is generated at reference voltage $V_0$. The gain ($G_0$) at reference voltage, $V_0$=output data signal $S_0$ obtained at reference voltage $V_0$ divided by output data signal $S_0$ obtained at reference voltage $V_0$=1. (i.e., $G_0$=1). At increasing voltages ($V_1$, $V_2$, . . . $V_{max}$), output data signals, ($S_1$, $S_2$, . . . $S_{max}$) are generated and the gain is calculated by dividing the output signal $S_n$ at each applied voltage by the reference output data signal $S_0$ ($S_1/S_0$, $S_2/S_0$, . . . $S_{max}/S_0$).

In certain embodiments, an applied voltage that is needed to generate a target photodetector gain is determined from the plot of the calculated gain-to-voltage ratio. In some instances, methods include determining the applied voltage needed to generate a target photodetector gain by interpolation of the plot of the calculated gain-to-voltage ratio. To control for inaccuracy in certain instances, a process is implemented to iteratively measure the gain at the middle point of two previously measured bias voltages until the derived gain from interpolation is close to the measured gain with the difference within the accuracy specification.

In some embodiments, methods include determining variance between photodetectors in the light detection system based on the plotted gain-to-voltage ratio for each photodetector. In some instances, the sensitivity of one or more photodetectors is determined to differ from the mean sensitivity of the photodetectors in the light detection system by 5% or more, such as by 10% or more, such as by 15% or more, such as by 20% or more, such as by 25% or more, such as by 50% or more, such as by 75% or more and including by 90% or more. In some instances, the output signal amplitude of one or more photodetectors is determined to differ from the mean output signal amplitude of the photodetectors in the light detection system by 5% or more, such as by 10% or more, such as by 15% or more, such as by 20% or more, such as by 25% or more, such as by 50% or more, such as by 75% or more and including by 90% or more. In some instances, methods include identifying a malfunctioning (or non-functioning) photodetector in the light detection system based on the plotted gain-to-voltage ratio for the photodetectors. In some embodiments, methods include adjusting one or more photodetectors in the light detection system of the particle analyzer to the detector voltage that generates an output data signal with the highest signal-to-noise ratio.

Systems for Determining Photodetector Gain for a Plurality of Photodetectors in a Light Detection System Aspects of the present disclosure also include systems (e.g., particle analyzer) having a light source and a light detection system that includes a plurality of photodetectors. In some embodiments, the subject systems are configured to determine an optimized detector gain for each photodetector in a light detection system. In some embodiments, the subject systems provide for identifying if one or more of the photodetectors in the light detection system are malfunctioning or require calibration. In certain instances, systems provide for simultaneous parameter characterization of a plurality of photodetectors in a light detection system, such as by parallel identification of gain-to-voltage curves of multiple photodetectors. Simultaneous characterization can in some instances, provide for consistency between photodetectors and improved sensitivity of the light detection system.

Systems according to certain embodiments include a light source, a light detection system (e.g., positioned in a housing of the particle analyzer) having a plurality of photodetectors and a processor that includes memory operably coupled to the processor where the memory includes instructions stored thereon, which when executed by the processor, cause the processor to apply a reference voltage to each photodetector in the light detection system, generate a reference data signal for each photodetector at the reference voltage, irradiate with a light source the photodetectors at a plurality of different applied voltages, generate output data signals for each photodetector at each of the plurality of different voltages and calculate gain of the photodetectors at each of the plurality of different applied voltages based on the output data signals for each photodetector at each applied voltage and the reference data signal.

In embodiments, systems are configured to apply a reference voltage to each photodetector in the light detection system and generate a reference data signal for each photodetector at each reference voltage. In some instances, the applied reference voltage is the lowest applied voltage that can be applied to the photodetector that generates a measurable output data signal. In certain instances, the generated reference data signal is a background data signal. In some embodiments, the system includes a processor that includes memory operably coupled to the processor where the memory includes instructions stored thereon, which when executed by the processor, cause the processor to apply the reference voltage to two or more of the photodetectors in the light detection system and generate reference data signals for the photodetectors, such as applying the reference voltage to 3 or more photodetectors, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including applying a reference voltage to 250 or more photodetectors of the light detection system and generating a reference data signal for each photodetector. For example, systems may be configured to apply a reference voltage to 5% or more of the photodetectors in the light detection system, such as 10% or more, such as 15% or more, such as 20% or more, such as 25% or more, such as 50% or more, such as 75% or more, such as 90% or more, such as 95% or more and including 97% or more of the photodetectors in the light detection system and to generate a reference data signal for each photodetector. In certain embodiments, systems are configured apply a reference voltage to all of the photodetectors in the light detection system and to generate a reference data signal for each photodetector.

In some embodiments, the memory includes instructions to apply the reference voltage in an amount sufficient to generate a reference data signal that is greater than photodetector noise from each photodetector by a predetermined separation index. In some instances, the generated reference data signal is greater than the separation index by at least 1% or more, such as by 2% or more, such as by 3% or more, such as by 4% or more, such as by 5% or more, such as by 10% or more, such as by 15% or more, such as by 20% or more, such as by 25% or more, such as by 50% or more, such as by 75% or more and including by 90% or more. In some instances, the separation index is a difference between the mean of data signals from each of the photodetectors normalized by the square root of the summed squared standard errors. In some instances, the memory includes instructions to determine a distinct separation index for one or more of the plurality of photodetectors, such as 2 or more, such as 3 or more, such as 4 or more, such as 5 or more and including 10 or more. In certain instances, the memory includes instructions to determine a distinct separation index for 5% or more of the plurality of photodetectors, such as 10% or more, such as 25% or more, such as 50% or more, such as 75% or more and including 90% or more of the plurality of photodetectors. In certain instances, the memory includes instructions to determine a distinct separation index for each of the plurality of photodetectors. In certain instances, the memory includes instructions to determine a single separation index and instructions to apply to each of the plurality of photodetectors. In certain instances, the memory includes instructions to determine a separation index that is based on background data signals from each photodetector and one or more parameters of the light source, such as irradiation intensity or output spectrum of the light source.

In certain embodiments, the memory includes instructions to incrementally increase the applied reference voltage until the generated reference data signal is distinguishable from the photodetector noise in each photodetector channel. In some instances, the memory includes instructions to incrementally increase the reference voltage by 0.001% or more until the generated reference data signal is distinguishable from the photodetector noise, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including to incrementally increase the reference voltage by 50% or more until the generated reference data signal is distinguishable from the photodetector noise. For example, the memory includes instructions to increase the reference voltage in increments of 0.0001 mV or more until the generated reference data signal is distinguishable from the photodetector noise in that photodetector channel, such as by 0.0005 mV or more, such as by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 2 mV or more, such as by 3 mV or more, such as by 4 mV or more, such as by 5 mV or more, such as by 10 mV or more, such as by 25 mV or more, such as by 50 mV or more, such as by 75 mV or more, such as by 100 mV or more, such as by 250 mV or more, such as by 500 mV or more, such as by 750 mV or more, such as by 1000 mV or more, such as by 2500 mV or more, such as 5000 mV or more and including by 10000 mV or more. In certain embodiments, if the gain control exceeds a predefined threshold and still not enough separation from the noise is found, the memory includes instructions to stop determining photodetector gain for one or more of the photodetector channels.

In embodiments, systems include a light source for irradiating the photodetectors at a plurality of applied voltages. In some instances, the plurality of photodetectors are irradiated simultaneously with the light source. In other instances, the plurality of photodetectors are irradiated sequentially with the light source. The light source may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of infra-red LEDs. In some embodiments, the light source includes one or more LEDs having a low coefficient of variation (cv). In some instances, the LED has a coefficient of variation of 25% or less, such as 20% or less, such as 15% or less, such as 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.4% or less, such as 0.3% or less, such as 0.2% or less, such as 0.1% or less, such as 0.05% or less, such as 0.01% or less, such as 0.001% or less and including where the LED has a coefficient of variation of 0.0001% or less.

In some embodiments, the light source includes one or more pulsed light sources (e.g., pulsed LED light source), such as where light is emitted at predetermined time intervals, each time interval having a predetermined irradiation duration (i.e., pulse width). In certain embodiments, the pulsed light source is configured to irradiate the photodetectors with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In certain embodiments, the light source is a continuous light source. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In certain embodiments, the light source is a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The light source may be positioned any suitable distance from the photodetectors of the light detection system, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle such as at an angle with the photodetectors of the light detection system, such as from 10° to 90°, such as from 15° to 85°, such as from 20° to 80°, such as from 25° to 75° and including from 30° to 60°, for example at a 90° angle.

In some embodiments, systems include memory operably coupled to the processor where the memory includes instructions stored thereon, which when executed by the processor, cause the processor to irradiate the plurality of photodetectors with the light source at each applied voltage for a predetermined time interval. In some embodiments, the memory includes instructions for irradiating the plurality of photodetectors at each applied voltage in discrete time intervals of 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. In certain embodiments, each predetermined time interval for irradiating the plurality of photodetectors is the same duration. In other embodiments, the predetermined time intervals for irradiating the plurality of photodetectors at each applied voltage are different.

In certain embodiments, the memory includes instructions for irradiating the photodetectors with the light source at a plurality of voltages each over a plurality of discrete time intervals, such as 3 or more different voltages, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 75 or more and including 100 or more different voltages. In some embodiments, the memory includes instructions for applying a voltage to each photodetector during an irradiation interval that is substantially constant for the duration of each predetermined time interval, such as where the applied voltage to the photodetector varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the memory includes instructions for applying a voltage to the photodetector that varies by 0.000001% or less for the duration of the predetermined time interval.

In some embodiments, systems include memory operably coupled to the processor where the memory includes instructions stored thereon, which when executed by the processor, cause the processor to change the applied voltage to each photodetector after each discrete irradiation interval. In some embodiments, the memory includes instructions for applying 5 or more different voltages to the photodetectors, such as 6 or more, such as 7 or more, such as 8 or more, such as 9 or more, such as 10 or more, such as 15 or more, such as 20 or more, such as 25 or more, such as 30 or more, such as 35 or more, such as 40 or more, such as 50 or more, such as 60 or more, such as 70 or more, such as 80 or more, such as 90 or more, such as 100 or more, such as 150 or more, such as 200 or more, such as 250 or more, such as 500 or more, such as 750 or more and including applying 1000 or more different voltages to the photodetectors. In some embodiments, the memory includes instructions for increasing the applied voltage to each photodetector after each discrete irradiation interval. In other embodiments, the memory includes instructions for decreasing the applied voltage to each photodetector after each discrete irradiation interval. The memory includes in certain instances, instructions to change the applied voltage to each photodetector after each discrete irradiation interval by 5% or more for each subsequent time interval, such as by 10% or more, such as by 25% or more, such as by 50% or more, such as by 75% or more, such as by 90% or more and including by 100% or more. In certain instances, the applied voltage to each photodetector is changed by 1.5-fold or more, such as by 2-fold or more, such as by 3-fold or more, such as by 4-fold or more and including by 5-fold or more. In some embodiments, the memory includes instructions to determine the increase in the applied voltage based on the two nearest voltages applied to the photodetector. In some instances, the memory includes instructions to calculate the increase in applied voltage by linear extrapolation from the two nearest voltages applied to the photodetector. In certain instances, the memory includes instructions to calculate the increase in applied voltage based on a polynomial function that locally approximates a voltage curve for the photodetector. In certain instances, the memory includes instructions where if the calculated bias voltage exceeds a predefined threshold, it will fall back to this threshold so that overshooting can be alleviated.

In certain embodiments, the memory includes instructions for determining baseline noise generated by each photodetector at each of the plurality of different applied voltages. In some instances, the baseline noise generated by each photodetector is determined to be greater than a predetermined threshold at an applied voltage, such as by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including by 50% or more. In certain instances, the memory includes instructions to discard output data signals from the photodetectors at the applied voltage when the baseline noise is greater than the predetermined threshold, such as when the baseline noise is greater than the predetermined threshold by 1% or more, such as by 2% or more, such as by 3% or more, such as by 4% or more, such as by 5% or more and including when the baseline noise is greater than the predetermined threshold by 10% or more. In certain embodiments, if the baseline noise is measured to be higher than the predetermined threshold, the memory includes instructions to determine photodetector gain in the photodetector channel may be stopped. An empirical bound on the maximum gain is, in certain instances also implemented such that once the gain exceeds this bound determining photodetector gain in the photodetector channel may be stopped.

In some instances, the memory includes instructions for irradiating the photodetectors with the light source at a plurality of increasing applied voltages. Depending on the type of photodetector (e.g., photomultiplier tube, avalanche photodiode, etc., as described below), the applied voltages may be increased by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including in increasing increments of by 50% or more. In certain instances, the memory includes instructions for increasing the applied voltage by 2-fold or more, such as by 3-fold or more, such as by 5-fold or more and including by 10-fold or more. In some embodiments, the memory includes instructions for increasing the voltage applied to each photodetector by 0.0001 mV or more, such as by 0.0005 mV or more, such as by 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 2 mV or more, such as by 3 mV or more, such as by 4 mV or more, such as by 5 mV or more, such as by 10 mV or more, such as by 25 mV or more, such as by 50 mV or more, such as by 75 mV or more, such as by 100 mV or more, such as by 250 mV or more, such as by 500 mV or more, such as by 750 mV or more, such as by 1000 mV or more, such as by 2500 mV or more, such as 5000 mV or more and including by 10000 mV or more.

In some embodiments, the memory includes instructions for maintaining irradiation of each photodetector in the light detection system by the light source while the applied voltage to each photodetector is being changed (e.g., while the applied voltage to each photodetector is being increased). In other instances, the memory includes instructions for stopping irradiation of one or more of the photodetectors in the light detection system by the light source for the duration the applied voltage to the photodetectors is being changed (e.g., by turning off the light source or by blocking the light source such as with a chopper, beam stop, etc.). Systems can include any convenient protocol to provide intermittent irradiation, such as an electronic switch for turning the light source on-and-off, such as a switch that is computer-controlled and triggered based on a data signal (e.g., received or inputted data signal). In some embodiments, the time interval for changing the applied voltage to each photodetector may be 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 6 ms or more, such as 7 ms or more, such as 8 ms or more, such as 9 ms or more and including 10 ms or more. For example, the time period between each predetermined time interval for irradiating the plurality of photodetectors with the light source may be from 0.001 ms to 25 ms, such as from 0.005 ms to 20 ms, such as from 0.01 ms to 15 ms, such as from 0.05 ms to 10 ms and including from 0.1 ms to 5 ms. In certain embodiments, the memory includes instructions for determining one or more noise parameters of each photodetector from the background data signal at each applied voltages, such as 2 or more noise parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including 250 or more noise parameters of each photodetector from the background data signal at each applied voltage.

Photodetectors of the light detection system may be any convenient light detecting protocol, including but not limited to photosensors or photodetectors, such as active-pixel sensors (APSs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, avalanche photodiodes (APDs), photomultiplier tubes (PMTs), silicon photomultipliers (SiPMs), phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In some embodiments, light detection systems include a plurality of photodetectors, such as 2 or more photodetectors, such as 5 or more photodetectors, such as 10 or more photodetectors, such as 25 or more photodetectors, such as 50 or more photodetectors, such as 100 or more photodetectors and including 1000 or more photodetectors. In some embodiments, light detection systems also include a plurality of amplifiers where each amplifier is in electrical communication with at least one photodetector, such as 2 or more amplifiers, such as 5 or more amplifiers, such as 10 or more amplifiers, such as 25 or more amplifiers, such as 50 or more amplifiers, such as 100 or more amplifiers and including 1000 or more amplifiers. In certain embodiments, light detection systems include a photodetector array. In some instances, light detection systems include a photodetector array having N photodetectors and an amplifier component having M amplifiers where N is an integer from 4 to 10000 and M is an integer from 4 to 10000. In certain instances, the number of photodetectors in the array is the same as the number of amplifiers (i.e., N is equal to M). In other instances, the number of photodetectors in the array is greater than the number of amplifiers (i.e., N is greater than M). In yet other instances, the number of photodetectors in the array is less than the number of amplifiers (i.e., N is less than M).

In embodiments, the photodetectors may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths. In some embodiments, photodetectors measure light over a range of wavelengths (e.g., 200 nm-1500 nm). For example, the photodetectors may collect spectra of light over one or more of the wavelength ranges of 200 nm-1500 nm. In yet other embodiments, the photodetectors may measure light at one or more specific wavelengths. For example, the light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

In some embodiments, systems include memory operably coupled to the processor where the memory includes instructions stored thereon, which when executed by the processor, cause the processor to integrate the output data signals from each irradiated photodetector in the light detection system. In some embodiments, the memory includes instructions for integrating the output data signals from each photodetector over 10% or more of the duration of each discrete interval of irradiation, such as 15% or more, such as 20% or more, such as 25% or more, such as 50% or more, such as 75% or more, such as 90% or more and including integrating the data signals over 99% of the duration of each discrete interval of irradiation. In some embodiments, the memory include instructions for integrating the output data signals from each photodetector in the light detection system over the entire duration of each discrete time interval of irradiation by the light source.

In some embodiments, the memory includes instructions for increasing the voltage of each photodetector in the light detection system until one or more of the photodetectors is saturated. As described above, the term "saturated" is used herein in its conventional sense to refer to the upper limit of detection by the photodetector where output data signals exhibit little to no change in response to increasing light irradiation intensity or applied voltage. In certain instances, the photodetector is saturated when the photodetector at its maximal detection limit. In other instances, the photodetector is saturated when the photodetector is set to its maximal applied voltage setting. The memory according to certain embodiments includes instructions for determining that one or more of the photodetectors of the light detection system is saturated based on the output data signals. For example, depending on the number of photodetectors in the light detection system two or more of the photodetectors may be determined to be saturated, such as 3 or more, such as 4 or more, such as 5 or more, such as 6 or more, such as 7 or more, such as 8 or more, such as 9 or more, such as 10 or more, such as 15 or more, such as 25 or more, such as 50 or more and including determining that 100 or more of the photodetectors in the light detection system are saturated. In certain instances, the memory includes instructions for determining the percentage of photodetectors that are saturated at an applied voltage setting, such as 1% or more, such as 2% or more, such as 3% or more, such as 4% or more, such as 5% or more, such as 10% or more, such as 20% or more, such as 30% or more, such as 40% or more, such as 50% or more, such as 75% or more and including determining that 90% or more of the photodetectors in the light detection system are saturated at an applied voltage setting. In certain embodiments, when one or more of the photodetectors is determined to be saturated, the memory includes instructions for discarding generated output data signals of the saturated photodetectors.

In some embodiments, when one or more of the photodetectors is determined to be saturated, the memory includes instructions for reducing the intensity of the light source to a lower intensity. In some embodiments, the memory includes instructions for reducing the intensity of the light source from a first intensity to a second, lower intensity where the intensity of the light source is reduced by 1% or more, such as by 2% or more, such as by 3% or more, such as by 4% or more, such as by 5% or more, such as by 6% or more, such as by 7% or more, such as by 8% or more, such as by 9% or more, such as 10% or more, such as by 20% or more, such as by 30% or more, such as by 40% or more, such as by 50% or more, such as by 60% or more, such as by 70% or more, such as by 80% or more, such as by 90% or more and including reducing the intensity of the light source by 95% or more. In certain instances, the memory includes instructions for reducing the intensity of the light source by 99% or more. In some instances, the memory includes instructions for reducing the intensity of the light source by 1.5-fold or more, such as 2-fold or more, such as by 3-fold or more, such as by 4-fold or more, such as by 5-fold or more, such as by 6-fold or more, such as by 7-fold or more, such as by 8-fold or more, such as by 9-fold or more, such as by 10-fold or more, such as by 15-fold or more, such as by 20-fold or more, such as by 25-fold or more, such as by 50-fold or more and including by 100-fold or more.

In some embodiments, the memory includes instructions for reducing the intensity of irradiation by the light source to a lower intensity (as described above), instructions for irradiating the photodetectors at the lower intensity and instructions for generating output data signals for each photodetector at a plurality of different applied voltages. In some instances, the memory includes instructions to irradiate the photodetectors at the lower intensity at 2 or more different applied voltages, such as 3 or more different voltages, such as 4 or more, such as 5 or more, such as 6 or more, such as 7 or more, such as 8 or more, such as 9 or more, such as 10 or more, such as 15 or more, such as 20 or more and including 25 or more or more different voltages. In some instances, the memory includes instructions to irradiate the photodetectors at the lower intensity at a plurality of increasing applied voltages, such as where the applied voltages may be increased by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 10% or more, such as by 15% or more, such as by 25% or more and including in increasing by 50% or more.

In some embodiments, systems include memory operably coupled to the processor where the memory includes instructions stored thereon, which when executed by the processor, cause the processor to irradiate the photodetectors at the lower intensity until one or more of the photodetectors are saturated. In these embodiments, the memory may include instructions for repeating this irradiation cycle (i.e., instructions for determining that one or more photodetector is saturated, instructions for lowering the irradiation intensity of the light source and instructions for irradiating the photodetectors at the lowered irradiation intensity at increasing applied voltages until one or more photodetectors are saturated) one or more times, such as 2 or more times, such as 3 or more times, such as 4 or more times, such as 5 or more times, such as 6 or more times, such as 7 or more times, such as 8 or more times, such as 9 or more times and including 10 or more times. In certain instances, the memory includes instructions for calculating a scaling factor for the generated output data signals of the photodetectors that are determined to not be saturated. In certain instances, a different scaling factor is calculated for each photodetector based on one or more parameters of the light source, such as the intensity variation at different emitted wavelengths or the spectral sensitivity of the photodetector. In some embodiments, the memory includes instructions for determining that the calculated gain for a photodetector changes monotonically between two or more of the different applied voltages, such as 3 or more, such as 4 or more, such as 5 or more and including between 10 or more different applied voltages. In some instances, the memory include instructions to determine that the calculated gain for a photodetector changes non-monotonically between two or more of the different applied voltages. For example, the calculated gain may be determined to be within the noise level of the photodetector channel, exhibiting non-monotonic changes between different applied voltages. In certain instances, the memory includes instructions to discard one or more output data signals from the photodetector when the calculated gain for a photodetector changes non-monotonically between two or more of the different applied voltages.

In some embodiments, the memory includes instructions for generating output data signals for each photodetector at increasing voltages until all of the photodetectors in the light detection system are set to maximum voltage. In certain embodiments, the memory includes instructions for repeating each irradiation cycle until a predetermined number of photodetectors in the light detection system reaches a maximum applied voltage or exhibit a saturated output data signal. In some instances, the memory includes instructions for repeating the irradiation cycles until 5% or more of the photodetectors reach a maximum applied voltage or exhibit a saturated output data signal, such as 10% or more, such as 20% or more, such as 30% or more, such as 40% or more, such as 50% or more, such as 60% or more, such as 70% or more, such as 80% or more, such as 90% or more, such as 95% or more, such as 97% or more, such as 99% or more and including where 99.9% or more of the photodetectors in the light detection system have reached a maximum applied voltage or exhibit a saturated output data signal. In certain embodiments, the memory includes instructions for repeating the irradiation cycle until all (i.e., 100%) of the photodetectors in the light detection system have reached a maximum applied voltage or exhibit a saturated output data signal. In some instances, the memory includes instructions for generating output data signals for each photodetector at the plurality of different applied voltages until a maximum photodetector gain is determined for each photodetector. In some instances, the memory includes instructions to generate output data signals for each photodetector at the plurality of different applied voltages until baseline noise generated by a photodetector is greater than a predetermined threshold. In some instances, the memory includes instructions for generating output data signals for each photodetector at the plurality of different applied voltages until a minimal intensity of the light source can be applied to generate an output signal that is greater than the baseline noise of the photodetector. In some instances, the memory includes instructions to generate output data signals for each photodetector at the plurality of different applied voltages until the calculated gain for a photodetector changes non-monotonically between two or more of the different applied voltages. In certain instances, the memory includes instructions to generate output data signals for each photodetector at the plurality of different applied voltages until failure to identify a reference gain control.

Output data signals from the photodetectors are generated for each of the plurality of applied voltages. In some embodiments, the memory includes instructions for comparing the generated output data signals for the plurality of applied voltages to the reference data signal at each applied voltage. In some embodiments, the memory includes for calculating a ratio of photodetector gain-to-voltage at the plurality of voltages for each photodetector in the light detection system. In some instances, the photodetector gain at each applied voltage for each detector is calculated by normalizing the output data signals to the reference data signal. In certain instances, the memory includes instructions for calculating the gain of each photodetector at each voltage according to:

6) Gain ($G_0$) at reference voltage, $V_0$=output data signal $S_0$ obtained at reference voltage $V_0$ divided by output data signal $S_0$ obtained at reference voltage $V_0$=1. (i.e., $G_0$=1)
7) Gain ($G_1$) at voltage, $V_1$ (where $V_1 > V_0$)=output data signal $S_1$ obtained at voltage $V_1$ divided by output data signal $S_0$ obtained at applied voltage $V_1 = S_1/S_0$. (i.e., $G_1 = S_1/S_0$)
8) Gain ($G_2$) at voltage, $V_2$ (where $V_2 > V_1$)=output data signal $S_2$ obtained at voltage $V_2$ divided by output data signal $S_0$ obtained at applied voltage $V_2 = S_2/S_0$. (i.e., $G_2 = S_2/S_0$)
9) Gain ($G_{n+1}$) at voltage, $V_{n+1}$ (where $V_{n+1} > V_n$)=output data signal $S_{n+1}$ obtained at voltage $V_{n+1}$ divided by output data signal $S_0$ obtained at applied voltage $V_{n+1} = S_{n+1}/S_0$. (i.e., $G_{n+1} = S_{n+1}/S_0$)
10) Gain ($G_{max}$) at photodetector maximum voltage, $V_{max}$=output data signal $S_{max}$ obtained at photodetector maximum voltage $V_{max}$ divided by output data signal $S_0$ obtained at photodetector maximum voltage $V_{max} = S_{max}/S_0$. (i.e., $G_{max} = S_{max}/S_0$)

In certain instances, the memory includes instructions for plotting the calculated photodetector gain-to-voltage ratio for each photodetector in the light detection system. In some instances, the plotted gain-to-voltage ratio includes the gain of each photodetector at each applied voltage before determining that one or more photodetectors in the light detection system are saturated. In other instances, the plotted gain-to-voltage ratio includes the gain of each photodetector at each applied voltage after one or more of photodetectors in the light detection system are saturated, such as by post-process stitching of the gain-to-voltage ratios using the calculated scaling factor described above. In some instances, the memory includes instructions for stopping the post-process stitching when an incorrect measured stitching ratio is provided or not consistent with one or more processor settings.

In certain embodiments, the memory includes instructions to determine an applied voltage that is needed to generate a target photodetector gain from the plot of the calculated gain-to-voltage ratio. In some instances, the memory includes instructions for determining the applied voltage needed to generate a target photodetector gain by interpolation of the plot of the calculated gain-to-voltage ratio. To control for inaccuracy in certain instances, a process is implemented to iteratively measure the gain at the middle point of two previously measured bias voltages until the derived gain from interpolation is close to the measured gain with the difference within the accuracy specification.

In some embodiments, the memory includes instructions for determining variance between photodetectors in the light detection system based on the plotted gain-to-voltage ratio for each photodetector. In some instances, the memory includes instructions for determining that the sensitivity of one or more photodetectors is different from the mean sensitivity of the photodetectors in the light detection system by 5% or more, such as by 10% or more, such as by 15% or more, such as by 20% or more, such as by 25% or more, such as by 50% or more, such as by 75% or more and including by 90% or more. In some instances, the memory includes instructions for determining that the output signal amplitude of one or more photodetectors is different from the mean output signal amplitude of the photodetectors in the light detection system by 5% or more, such as by 10% or more, such as by 15% or more, such as by 20% or more, such as by 25% or more, such as by 50% or more, such as by 75% or more and including by 90% or more. In some instances, the memory includes instructions for identifying a malfunctioning (or non-functioning) photodetector in the light detection system based on the plotted gain-to-voltage ratio for the photodetectors. In some embodiments, the memory includes instructions for adjusting one or more photodetectors in the light detection system of the particle analyzer to the detector voltage that generates an output data signal with the highest signal-to-noise ratio.

In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols, Methods* in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
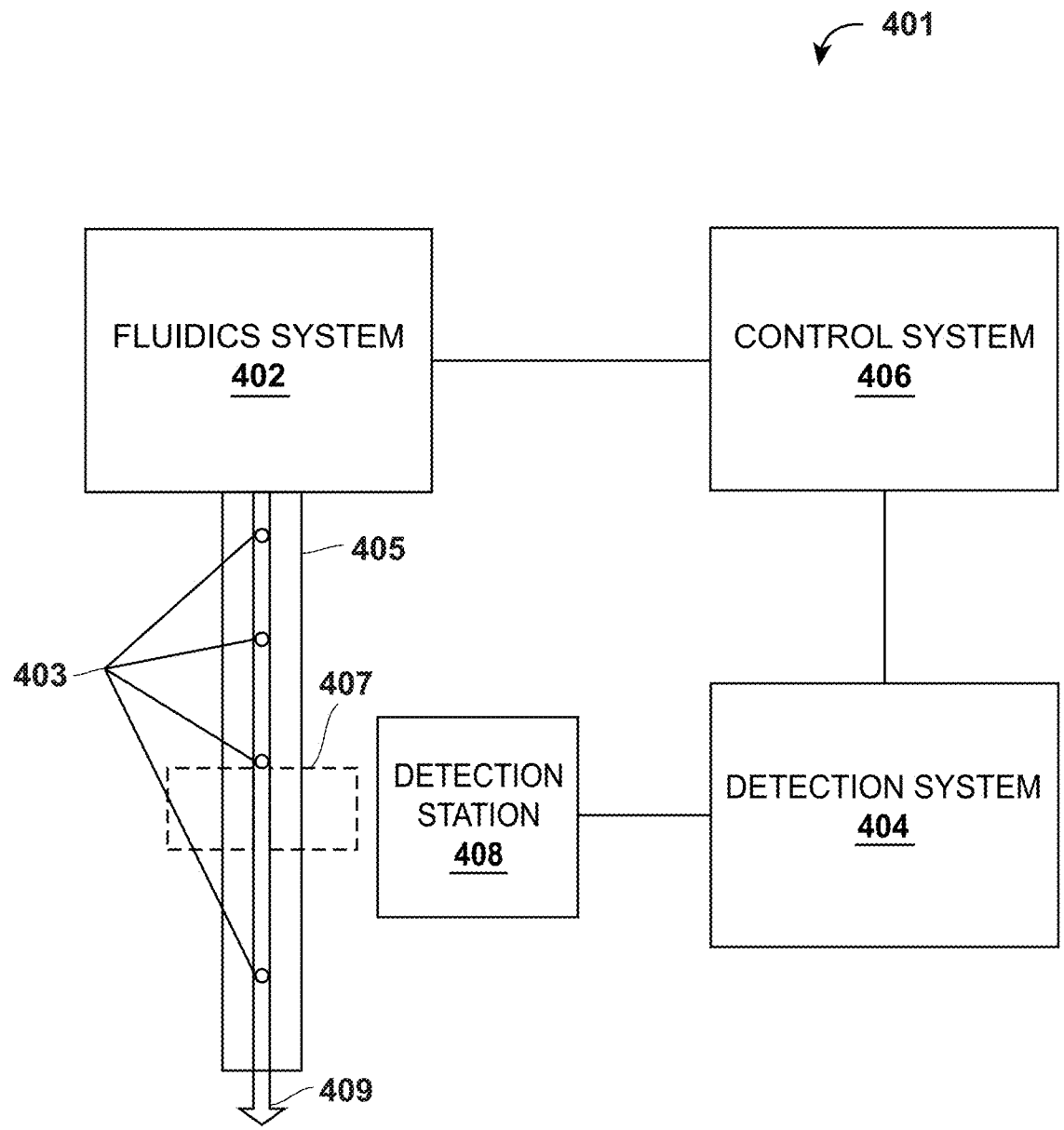
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
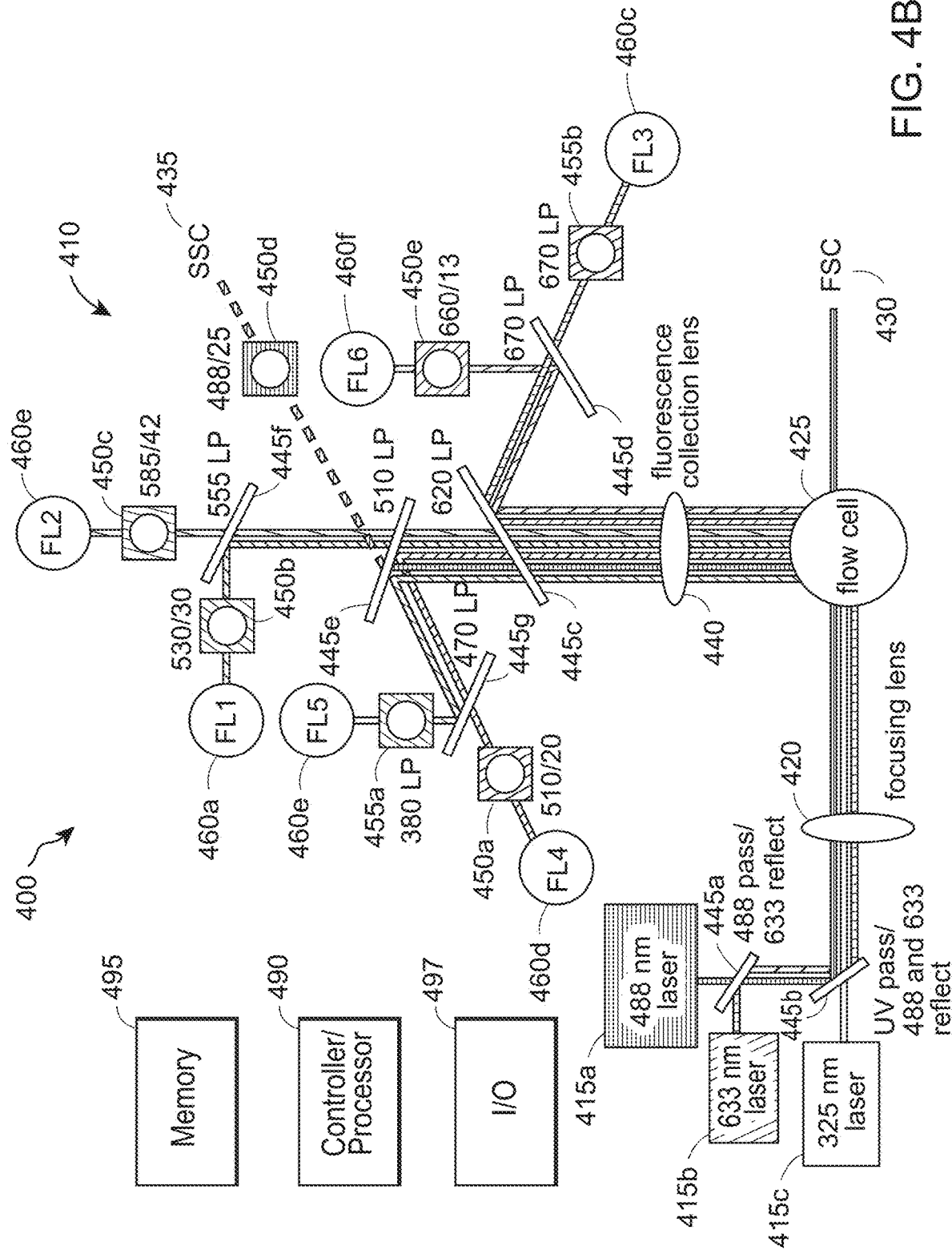
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
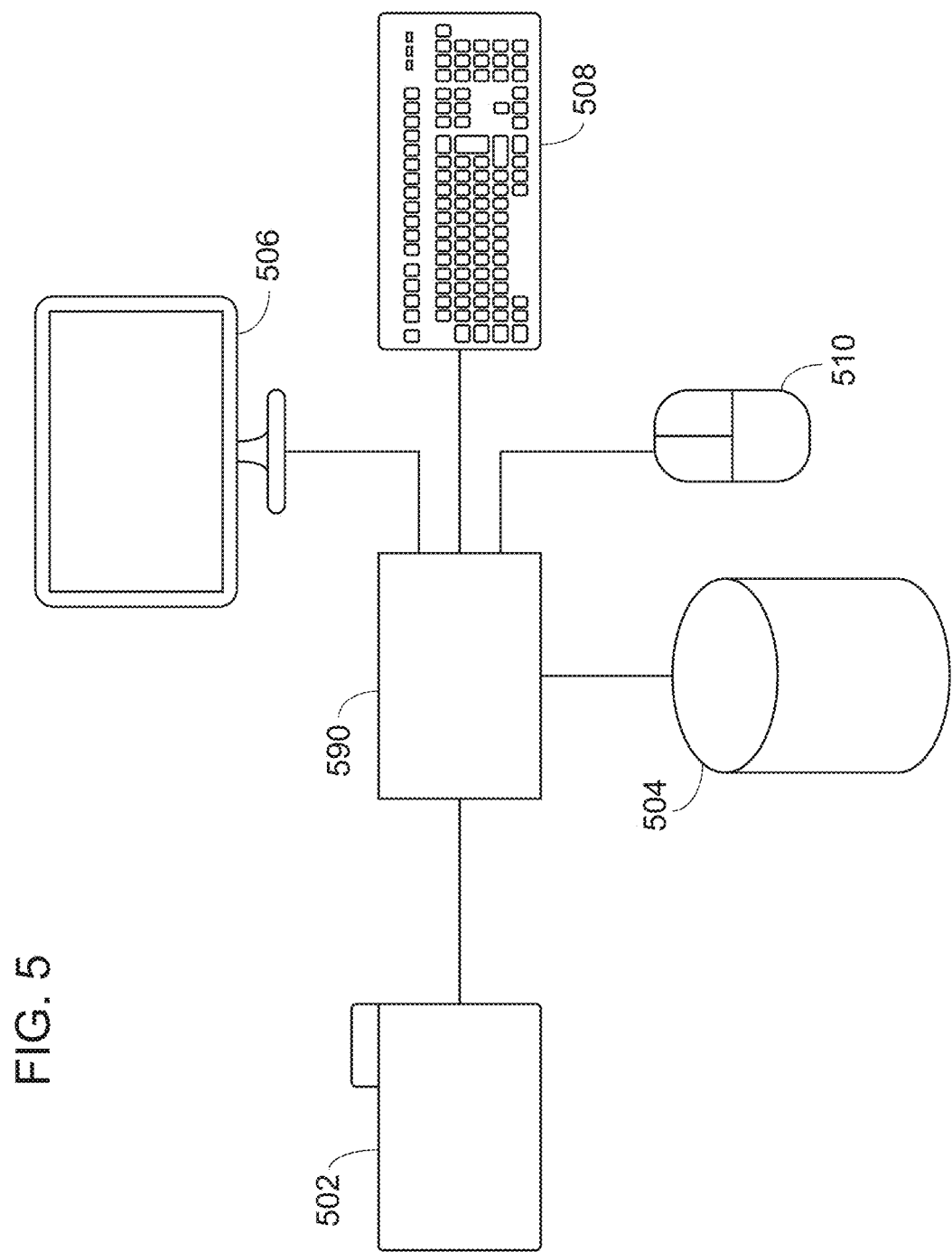
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
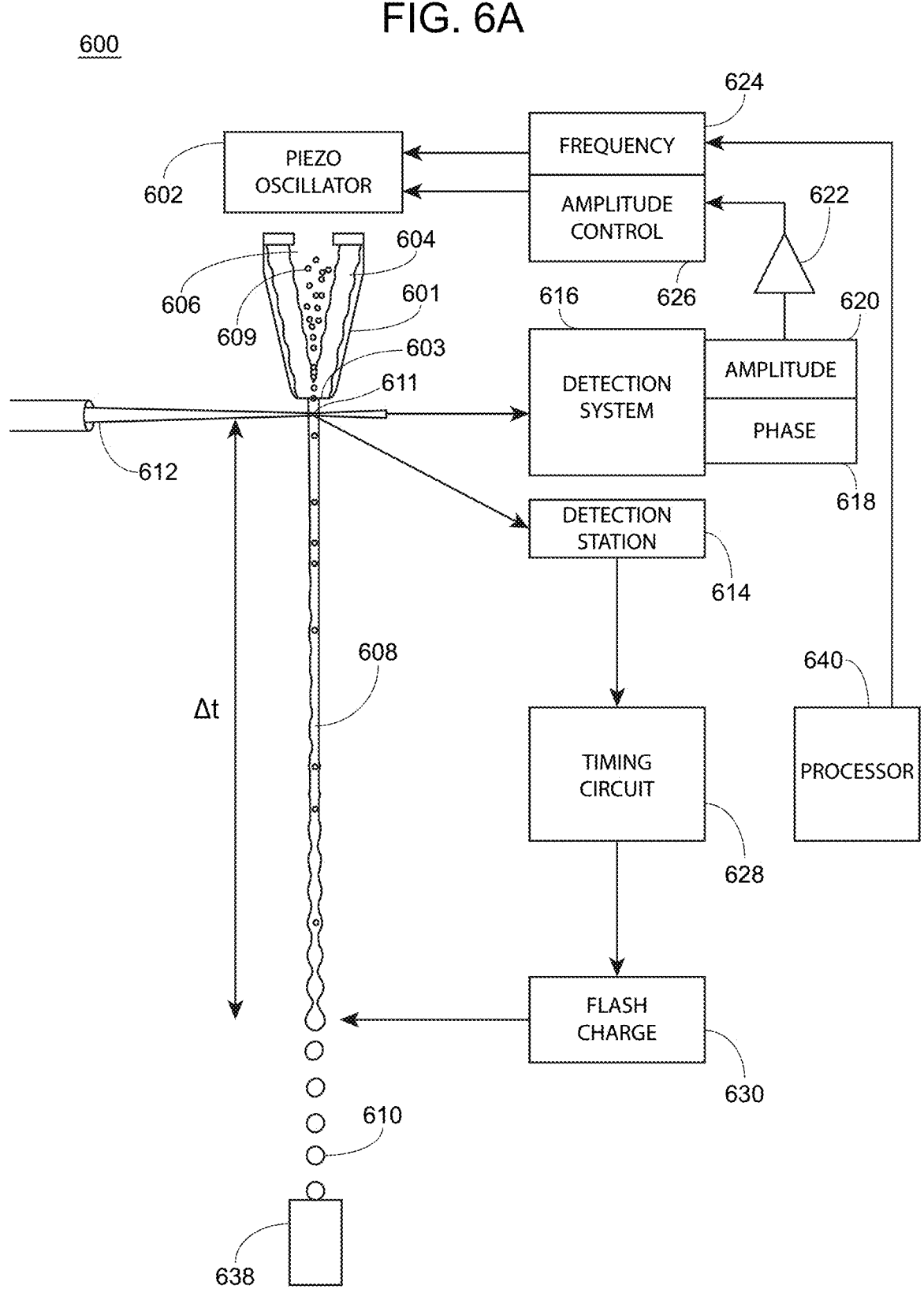
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (at), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
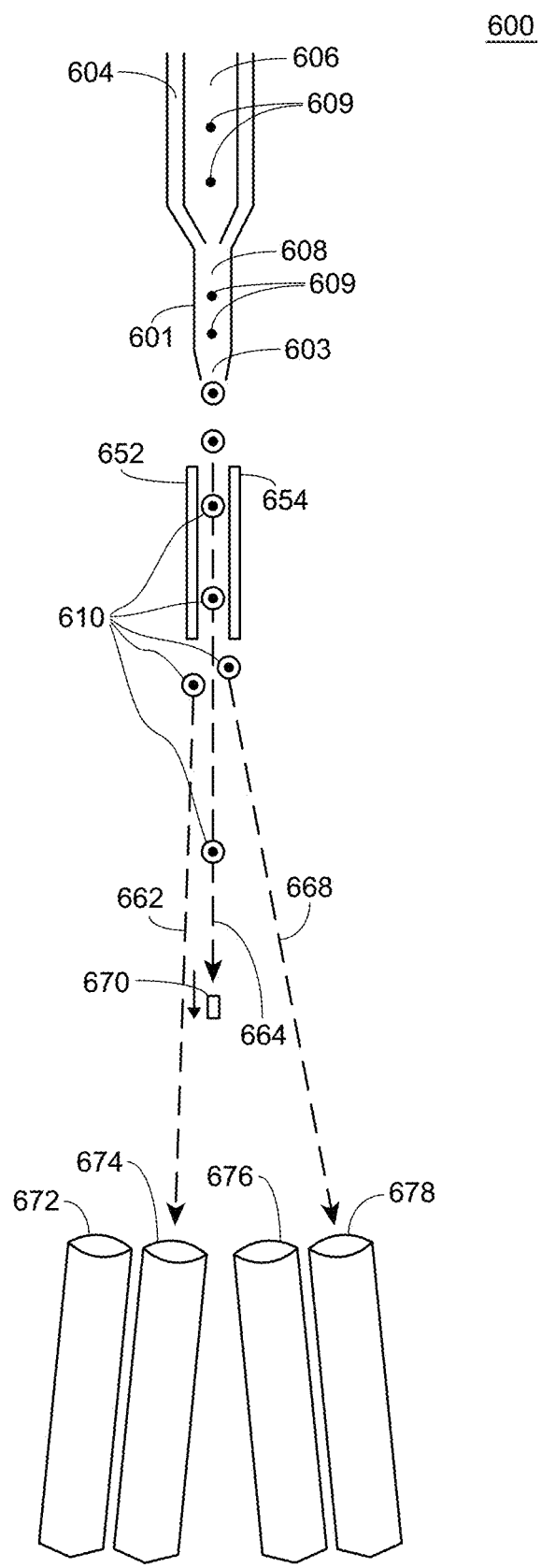
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for applying a reference voltage to each photodetector in the light detection system, instructions for generating a reference data signal for each photodetector at the reference voltage, instructions for irradiating with a light source the photodetectors at a plurality of different applied voltages, instructions for generating output data signals for each photodetector at each of the plurality of different voltages and instructions for calculating gain of the photodetectors at each of the plurality of different applied voltages based on the output data signals for each photodetector at each applied voltage and the reference data signal.

In some embodiments, the computer program includes instructions for applying a reference voltage to each photodetector and instructions for generating a reference data signal for each photodetector at the reference voltage. In some embodiments, the computer program includes instructions for determining a background signal from each photodetector over a range of operating voltages of the photodetector, such as determining the background data signal of the photodetector over the entire operating voltage range of each photodetector. In some embodiments, the computer program includes instructions for applying the reference voltage in an amount sufficient to generate a reference data signal that is greater than photodetector noise from each photodetector by a predetermined separation index. In some instances, the separation index is a difference between the mean of data signals from each of the photodetectors normalized by the square root of the summed squared standard errors. In some instances, the computer program includes instructions for determining the separation index for each photodetector. In certain instances, the separation index is based on background data signals from each photodetector and one or more parameters of the light source, such as irradiation intensity or output spectrum of the light source. In certain embodiments, the computer program includes instructions for incrementally increasing the applied reference voltage until the generated reference data signal is distinguishable from the photodetector noise for each photodetector.

In some embodiments, the computer program includes instructions to set the photodetectors to different voltages and instructions for irradiating the photodetectors with a light source. In some instances, the computer program includes instructions for irradiating the plurality of photodetectors simultaneously. In some instances, the computer program includes instructions for irradiating the plurality of photodetectors sequentially. In certain instances, the computer program includes instructions for increasing the applied voltage to each photodetector, such as increasing the applied voltage to 5 or more different voltages, such as 10 or more and including 20 or more different voltages. The increase in voltage may be the same for each of the photodetectors in the light detection system after each irradiation cycle or may be a different voltage increase for one or more of the photodetectors. In some embodiments, each increase in applied voltage is based on the two nearest voltages applied to the photodetector. In some instances, the computer program includes instructions for calculating the increase in applied by linear extrapolation from the two nearest voltages applied to the photodetector. In certain instances, the computer program includes instructions for calculating the increase in applied voltage based on a polynomial function that locally approximates a voltage curve for the photodetector. In certain embodiments, the computer program includes instructions for determining baseline noise generated by each photodetector at each of the plurality of different applied voltages. In some instances, the computer program includes instructions for determining that the baseline noise generated by each photodetector is greater than a predetermined threshold at an applied voltage. In certain instances, the computer program includes instructions for discarding output data signals from the photodetectors at the applied voltage when the baseline noise is greater than the predetermined threshold.

In some embodiments, the computer program includes instructions for increasing the voltage of each photodetector in the light detection system until one or more of the photodetectors is saturated. In some instances, the computer program includes instructions for determining that an output data signal of one or more of the photodetectors is saturated. In certain instances, the computer program includes instructions to discard one or more output data signals from the photodetectors determined to be saturated. In some embodiments, the computer program includes instructions to reduce the intensity of the light source, such as in response to determining that one or more of the photodetectors is saturated. In some instances, the computer program includes instructions to reduce the intensity of the light source by 5% or more, such as 10% or more and including 50% or more. In some instances, the computer program includes instructions for reducing intensity of the light source is reduced by 1.5-fold or more, such as 2-fold or more, such as by 3-fold or more, such as by 4-fold or more, such as by 5-fold or more, such as by 6-fold or more, such as by 7-fold or more, such as by 8-fold or more, such as by 9-fold or more, such as by 10-fold or more, such as by 15-fold or more, such as by 20-fold or more, such as by 25-fold or more, such as by 50-fold or more and including reducing intensity of the light source by 100-fold or more. In certain embodiments, the computer program includes instructions to reduce the intensity of the light source to a lower intensity, instructions to irradiate the photodetectors at the lower intensity and instructions to generate output data signals for each photodetector at a plurality of different applied voltages. In some instances, the computer program includes instructions to generate output data signals at the reduced irradiation intensity for each photodetector at increasing applied voltages. In certain instances, the computer program includes instructions to calculate a scaling factor for the generated output data signals of the photodetectors that are determined to not be saturated. In some embodiments, the computer program includes instructions for determining that the calculated gain for a photodetector changes monotonically between two or more of the different applied voltages. In some instances, the computer program includes instructions for determining that the calculated gain for a photodetector changes non-monotonically between two or more of the different applied voltages. In certain instances, the computer program includes instructions for discarding one or more output data signals from the photodetector when the calculated gain for a photodetector changes non-monotonically between two or more of the different applied voltages.

In some embodiments, the computer program includes instructions to generate output data signals for each of the plurality of photodetectors at increasing voltages until all of the photodetectors in the light detection system are set to maximum voltage. In some instances, the computer program includes instructions for generating output data signals for each photodetector at the plurality of different applied voltages until a maximum photodetector gain is determined for each photodetector. In some instances, the computer program includes instructions for generating output data signals for each photodetector at the plurality of different applied voltages until baseline noise generated by a photodetector is greater than a predetermined threshold. In some instances, the computer program includes instructions for generating output data signals for each photodetector at the plurality of different applied voltages until a minimal intensity of the light source can be applied to generate an output signal that is greater than the baseline noise of the photodetector. In some instances, the computer program includes instructions for generating output data signals for each photodetector at the plurality of different applied voltages until the calculated gain for a photodetector changes non-monotonically between two or more of the different applied voltages.

In some embodiments, the computer program includes instructions for calculating a ratio of photodetector gain-to-voltage at the plurality of voltages for each photodetector in the light detection system. In some instances, the computer program includes instructions for calculating the photodetector gain at each applied voltage for each photodetector by normalizing the output data signals to the reference data signal. In certain instances, the computer program includes instructions for plotting the calculated photodetector gain-to-voltage ratio is plotted for each photodetector in the light detection system. In some instances, the computer program includes instructions for determining variance between photodetector in the light detection system based on the plotted gain-to-voltage ratio for each photodetector. In some instances, the computer program includes instructions for identifying a malfunctioning (or non-functioning) photodetector in the light detection system based on the plotted gain-to-voltage ratio for the photodetectors. In some embodiments, the computer program includes instructions for adjusting one or more photodetectors in the light detection system of the particle analyzer to the detector voltage that generates an output data signal with the highest signal-to-noise ratio. In certain embodiments, the computer program includes instructions for determining an applied voltage that is needed to generate a target photodetector gain from the plot of the calculated gain-to-voltage ratio. In some instances, the computer program includes instructions for determining the applied voltage needed to generate a target photodetector gain by interpolation of the plot of the calculated gain-to-voltage ratio.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
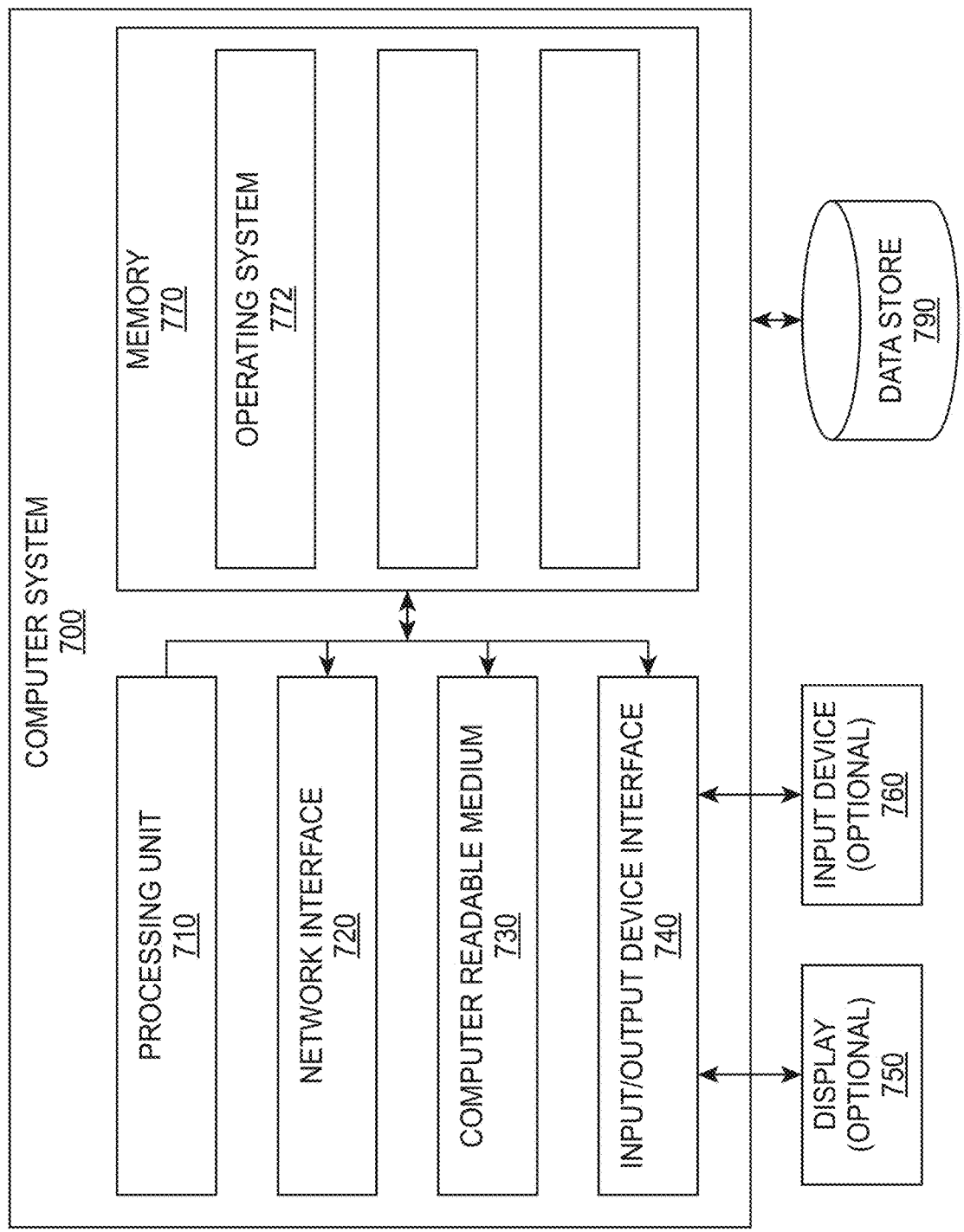
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Non-Transitory Computer-Readable Storage Medium for Determining Photodetector Gain for a Plurality of Photodetectors in a Light Detection System Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for applying a reference voltage to each photodetector in the light detection system, algorithm for generating a reference data signal for each photodetector at the reference voltage, algorithm for irradiating with a light source the photodetectors at a plurality of different applied voltages, algorithm for generating output data signals for each photodetector at each of the plurality of different voltages and algorithm for calculating gain of the photodetectors at each of the plurality of different applied voltages based on the output data signals for each photodetector at each applied voltage and the reference data signal.

In some embodiments, the non-transitory computer readable storage medium includes algorithm for applying a reference voltage to each photodetector and instructions for generating a reference data signal for each photodetector at the reference voltage. In some embodiments, the non-transitory computer readable storage medium includes algorithm for determining a background signal from each photodetector over a range of operating voltages of the photodetector, such as determining the background data signal of the photodetector over the entire operating voltage range of each photodetector. In some embodiments, the non-transitory computer readable storage medium includes algorithm for applying the reference voltage in an amount sufficient to generate a reference data signal that is greater than photodetector noise from each photodetector by a predetermined separation index. In some instances, the separation index is a difference between the mean of data signals from each of the photodetectors normalized by the square root of the summed squared standard errors. In some instances, the non-transitory computer readable storage medium includes algorithm for determining the separation index for each photodetector. In certain instances, the separation index is based on background data signals from each photodetector and one or more parameters of the light source, such as irradiation intensity or output spectrum of the light source. In certain embodiments, the non-transitory computer readable storage medium includes algorithm for incrementally increasing the applied reference voltage until the generated reference data signal is distinguishable from the photodetector noise for each photodetector.

In some embodiments, the non-transitory computer readable storage medium includes algorithm for setting the photodetectors to different voltages and algorithm for irradiating the photodetectors with a light source. In some instances, the non-transitory computer readable storage medium includes algorithm for irradiating the plurality of photodetectors simultaneously. In some instances, the non-transitory computer readable storage medium includes algorithm for irradiating the plurality of photodetectors sequentially. In certain instances, the non-transitory computer readable storage medium includes algorithm for increasing the applied voltage to each photodetector, such as increasing the applied voltage to 5 or more different voltages, such as 10 or more and including 20 or more different voltages. The increase in voltage may be the same for each of the photodetectors in the light detection system after each irradiation cycle or may be a different voltage increase for one or more of the photodetectors. In some embodiments, each increase in applied voltage is based on the two nearest voltages applied to the photodetector. In some instances, the non-transitory computer readable storage medium includes algorithm for calculating the increase in applied by linear extrapolation from the two nearest voltages applied to the photodetector. In certain instances, the non-transitory computer readable storage medium includes algorithm for calculating the increase in applied voltage based on a polynomial function that locally approximates a voltage curve for the photodetector. In certain embodiments, the non-transitory computer readable storage medium includes algorithm for determining baseline noise generated by each photodetector at each of the plurality of different applied voltages. In some instances, the non-transitory computer readable storage medium includes algorithm for determining that the baseline noise generated by each photodetector is greater than a predetermined threshold at an applied voltage. In certain instances, the non-transitory computer readable storage medium includes algorithm for discarding output data signals from the photodetectors at the applied voltage when the baseline noise is greater than the predetermined threshold.

In some embodiments, the non-transitory computer readable storage medium includes algorithm for increasing the voltage of each photodetector in the light detection system until one or more of the photodetectors is saturated. In some instances, the non-transitory computer readable storage medium includes algorithm for determining that an output data signal of one or more of the photodetectors is saturated. In certain instances, the non-transitory computer readable storage medium includes algorithm for discarding one or more output data signals from the photodetectors determined to be saturated. In some embodiments, the non-transitory computer readable storage medium includes algorithm for reducing the intensity of the light source, such as in response to determining that one or more of the photodetectors is saturated. In some instances, the non-transitory computer readable storage medium includes algorithm for reducing the intensity of the light source by 5% or more, such as 10% or more and including 50% or more. In some instances, the non-transitory computer readable storage medium includes algorithm for reducing intensity of the light source is reduced by 1.5-fold or more, such as 2-fold or more, such as by 3-fold or more, such as by 4-fold or more, such as by 5-fold or more, such as by 6-fold or more, such as by 7-fold or more, such as by 8-fold or more, such as by 9-fold or more, such as by 10-fold or more, such as by 15-fold or more, such as by 20-fold or more, such as by 25-fold or more, such as by 50-fold or more and including reducing intensity of the light source by 100-fold or more. In certain embodiments, the non-transitory computer readable storage medium includes algorithm for reducing the intensity of the light source to a lower intensity, algorithm for irradiating the photodetectors at the lower intensity and algorithm for generating output data signals for each photodetector at a plurality of different applied voltages. In some instances, the non-transitory computer readable storage medium includes algorithm for generating output data signals at the reduced irradiation intensity for each photodetector at increasing applied voltages. In certain instances, the non-transitory computer readable storage medium includes algorithm for calculating a scaling factor for the generated output data signals of the photodetectors that are determined to not be saturated. In some embodiments, the non-transitory computer readable storage medium includes algorithm for determining that the calculated gain for a photodetector changes monotonically between two or more of the different applied voltages. In some instances, the non-transitory computer readable storage medium includes algorithm for determining that the calculated gain for a photodetector changes non-monotonically between two or more of the different applied voltages. In certain instances, the non-transitory computer readable storage medium includes algorithm for discarding one or more output data signals from the photodetector when the calculated gain for a photodetector changes non-monotonically between two or more of the different applied voltages.

In some embodiments, the non-transitory computer readable storage medium includes algorithm for generating output data signals for each of the plurality of photodetectors at increasing voltages until all of the photodetectors in the light detection system are set to maximum voltage. In some instances, the non-transitory computer readable storage medium includes algorithm for generating output data signals for each photodetector at the plurality of different applied voltages until a maximum photodetector gain is determined for each photodetector. In some instances, the non-transitory computer readable storage medium includes algorithm for generating output data signals for each photodetector at the plurality of different applied voltages until baseline noise generated by a photodetector is greater than a predetermined threshold. In some instances, the non-transitory computer readable storage medium includes algorithm for generating output data signals for each photodetector at the plurality of different applied voltages until a minimal intensity of the light source can be applied to generate an output signal that is greater than the baseline noise of the photodetector. In some instances, the non-transitory computer readable storage medium includes algorithm for generating output data signals for each photodetector at the plurality of different applied voltages until the calculated gain for a photodetector changes non-monotonically between two or more of the different applied voltages.

In some embodiments, the non-transitory computer readable storage medium includes algorithm for calculating a ratio of photodetector gain-to-voltage at the plurality of voltages for each photodetector in the light detection system. In some instances, the non-transitory computer readable storage medium includes algorithm for calculating the photodetector gain at each applied voltage for each photodetector by normalizing the output data signals to the reference data signal. In certain instances, the non-transitory computer readable storage medium includes algorithm for plotting the calculated photodetector gain-to-voltage ratio is plotted for each photodetector in the light detection system. In some instances, the non-transitory computer readable storage medium includes algorithm for determining variance between photodetector in the light detection system based on the plotted gain-to-voltage ratio for each photodetector. In some instances, the non-transitory computer readable storage medium includes algorithm for identifying a malfunctioning (or non-functioning) photodetector in the light detection system based on the plotted gain-to-voltage ratio for the photodetectors. In some embodiments, the non-transitory computer readable storage medium includes algorithm for adjusting one or more photodetectors in the light detection system of the particle analyzer to the detector voltage that generates an output data signal with the highest signal-to-noise ratio. In certain embodiments, the non-transitory computer readable storage medium includes algorithm for determining an applied voltage that is needed to generate a target photodetector gain from the plot of the calculated gain-to-voltage ratio. In some instances, the non-transitory computer readable storage medium includes algorithm for determining the applied voltage needed to generate a target photodetector gain by interpolation of the plot of the calculated gain-to-voltage ratio.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the components of light detection systems described herein. In some embodiments, kits include a plurality of photodetectors and programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to calibrate or optimize the photodetectors of a light detection system, such as where the photodetectors are calibrated or optimized simultaneously. The subject methods and systems also find use for light detection systems having a plurality of photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for determining photodetector gain for a plurality of photodetectors in a light detection system of a particle analyzer, the method comprising:
    applying a reference voltage to each photodetector in the light detection system;
    generating a reference data signal for each photodetector at the reference voltage;
    irradiating with a light source the photodetectors at a plurality of different applied voltages;
    generating output data signals for each photodetector at each of the plurality of different voltages; and
    calculating gain of the photodetectors at each of the plurality of different applied voltages based on the output data signals for each photodetector at each applied voltage and the reference data signal.

2. The method according to claim 1, wherein the method comprises applying the reference voltage in an amount sufficient to generate a reference data signal that is greater than photodetector noise from each photodetector by a predetermined separation index.

3. The method according to claim 2, wherein the method comprises incrementally increasing the applied reference voltage until the generated reference data signal is distinguishable from the photodetector noise for each photodetector.

4. The method according to claim 1, wherein photodetectors are irradiated with the light source at a plurality of increasing applied voltages.

5. The method according to claim 4, wherein each increase in applied voltage is based on the two nearest voltages applied to the photodetector.

6. The method according to claim 4, wherein the method further comprises determining that the generated output data signal of one or more of the photodetectors is saturated.

7. The method according to claim 6, wherein the method further comprises discarding the generated output data signals from the one or more photodetectors that are determined to be saturated.

8. The method according to claim 6, wherein the method comprises reducing intensity of the light source from a first intensity to a second intensity.

9. The method according to claim 7, wherein the method comprises:
    irradiating the photodetectors with the light source at the second intensity; and
    generating output data signals for each photodetector at a plurality of different applied voltages.

10. The method according to claim 8, wherein the light source is reduced in intensity by 20-fold or more.

11. The method according to claim 6, wherein the method comprises calculating a scaling factor for the generated output data signals of the photodetectors that are determined to be not saturated.

12. The method according to claim 1, wherein the method comprises determining that the calculated gain for a photodetector changes monotonically between two or more of the different applied voltages.

13. The method according to claim 1, wherein the method comprises determining that one or more of the photodetectors is set to maximum voltage.

14. The method according to claim 1, wherein the method comprises generating output data signals for each photodetector at increasing voltages until one or more of:
    all of the photodetectors in the light detection system are set to maximum voltage;
    a maximum photodetector gain is determined for each photodetector;
    baseline noise generated by a photodetector is greater than a predetermined threshold;
    a minimal intensity of the light source can be applied to generate an output signal that is greater than the baseline noise of the photodetector; and
    the calculated gain for a photodetector changes non-monotonically between two or more of the different applied voltages.

15. The method according to claim 1, wherein the method comprises calculating a ratio of gain-to-voltage at the plurality of voltages for each photodetector in the light detection system.

16. A particle analyzer comprising:
    a light source;
    a light detection system positioned in a housing of the particle analyzer, the light detection system comprising a plurality of photodetectors; and
    a processor comprising memory operably coupled to the processor wherein the memory comprises instructions stored thereon, which when executed by the processor, cause the processor to:
        apply a reference voltage to each photodetector in the light detection system;
        generate a reference data signal for each photodetector at the reference voltage;
        irradiate with a light source the photodetectors at a plurality of different applied voltages;
        generate output data signals for each photodetector at each of the plurality of different voltages; and
        calculate gain of the photodetectors at each of the plurality of different applied voltages based on the output data signals for each photodetector at each applied voltage and the reference data signal.

17. The particle analyzer according to claim 16, wherein the memory comprises instructions stored thereon, which when executed by the processor, cause the processor to irradiate the plurality of photodetectors at a plurality of increasing applied voltages.

18. The particle analyzer according to claim 17, wherein the memory comprises instructions stored thereon, which when executed by the processor, cause the processor to determine that the generated output data signal of one or more of the photodetectors is saturated.

19. The particle analyzer according to claim 18, wherein the memory comprises instructions stored thereon, which when executed by the processor, cause the processor to reduce intensity of the light source from a first intensity to a second intensity.

20. The particle analyzer according to claim 16, wherein the memory comprises instructions stored thereon, which when executed by the processor, cause the processor to apply the reference voltage in an amount sufficient to generate a reference data signal that is greater than photodetector noise from each photodetector by a predetermined separation index.

21. The particle analyzer according to claim 20, wherein the memory comprises instructions stored thereon, which when executed by the processor, cause the processor to incrementally increase the applied reference voltage until the generated reference data signal is distinguishable from the photodetector noise for each photodetector.

22. The particle analyzer according to claim 17, wherein the memory comprises instructions stored thereon, which when executed by the processor, cause the processor to increase the applied voltage to each photodetector based on the two nearest voltages applied to the photodetector.

23. The particle analyzer according to claim 16, wherein the memory comprises instructions stored thereon, which when executed by the processor, cause the processor to determine that the calculated gain for a photodetector changes monotonically between two or more of the different applied voltages.

24. The particle analyzer according to claim 16, wherein the memory comprises instructions stored thereon, which when executed by the processor, cause the processor to determine that one or more of the photodetectors is set to maximum voltage.

25. The particle analyzer according to claim 16, wherein the memory comprises instructions stored thereon, which when executed by the processor, cause the processor to generate output data signals for each photodetector at increasing voltages until one or more of:

all of the photodetectors in the light detection system are set to maximum voltage;

a maximum photodetector gain is determined for each photodetector;

baseline noise generated by a photodetector is greater than a predetermined threshold;

a minimal intensity of the light source can be applied to generate an output signal that is greater than the baseline noise of the photodetector; and the calculated gain for a photodetector changes non-monotonically between two or more of the different applied voltages.

26. A non-transitory computer readable storage medium comprising instructions stored thereon for determining photodetector gain for a plurality of photodetectors in a light detection system of a particle analyzer the instructions comprising:

algorithm for applying a reference voltage to each photodetector in the light detection system;

algorithm for generating a reference data signal for each photodetector at the reference voltage;

algorithm for irradiating with a light source the photodetectors at a plurality of different applied voltages;

algorithm for generating output data signals for each photodetector at each of the plurality of different voltages; and algorithm for calculating gain of the photodetectors at each of the plurality of different applied voltages based on the output data signals for each photodetector at each applied voltage and the reference data signal.

* * * * *